(12) United States Patent
Matsumura

(10) Patent No.: US 10,988,167 B2
(45) Date of Patent: Apr. 27, 2021

(54) POWER STEERING APPARATUS

(71) Applicant: HITACHI AUTOMOTIVE SYSTEMS, LTD., Hitachinaka (JP)

(72) Inventor: Tatsuo Matsumura, Higashimatsuyama (JP)

(73) Assignee: KNORR-BREMSE STEERING SYSTEM JAPAN LTD., Saitama (JP)

( * ) Notice: Subject to any disclaimer, the term of this patent is extended or adjusted under 35 U.S.C. 154(b) by 0 days.

(21) Appl. No.: 16/085,924

(22) PCT Filed: Feb. 3, 2017

(86) PCT No.: PCT/JP2017/004003
§ 371 (c)(1),
(2) Date: Sep. 17, 2018

(87) PCT Pub. No.: WO2017/159107
PCT Pub. Date: Sep. 21, 2017

(65) Prior Publication Data
US 2019/0111965 A1    Apr. 18, 2019

(30) Foreign Application Priority Data
Mar. 18, 2016  (JP) .............................. JP2016-055859

(51) Int. Cl.
*B62D 5/04*     (2006.01)
*B62D 5/065*    (2006.01)
(Continued)

(52) U.S. Cl.
CPC ............ *B62D 5/0463* (2013.01); *B62D 5/04* (2013.01); *B62D 5/065* (2013.01); *B62D 5/083* (2013.01);
(Continued)

(58) Field of Classification Search
None
See application file for complete search history.

(56) References Cited

U.S. PATENT DOCUMENTS 6,122,912 A *  9/2000 Phillips .................. B62D 5/065
                                                  60/413
9,452,777 B2 *  9/2016 Yoda ......................... H02K 7/06
(Continued)

FOREIGN PATENT DOCUMENTS

DE   10 2006 051 990 A   5/2008
JP      2005-096767 A    4/2005
(Continued)

*Primary Examiner* — Yuen Wong
*Assistant Examiner* — Hongye Liang
(74) *Attorney, Agent, or Firm* — Foley & Lardner LLP

(57) ABSTRACT

A power steering apparatus includes a steering shaft 10 including an input shaft 11, an intermediate shaft 13 connected through a first torsion bar 12 to the input shaft, and an output shaft 15 connected through a second torsion bar 14 to the intermediate shaft; a hollow motor 30 to provide a rotational force to the intermediate shaft; and a control device 60 including a microcomputer, and including an output shaft rotation angle presuming section 63 to presume an output shaft rotation angle θg based on signals of an input shaft rotation angle θh and an intermediate shaft rotation angle θm, a torsion spring constant g1 and g2 of the first and second torsion bars; and a motor drive control section 69 to control the hollow motor based on the output shaft rotation angle.

17 Claims, 14 Drawing Sheets

(51) Int. Cl.
  B62D 5/083    (2006.01)
  B62D 6/02    (2006.01)
  B62D 5/12    (2006.01)
  B62D 6/00    (2006.01)

(52) U.S. Cl.
  CPC ................ B62D 5/12 (2013.01); B62D 6/00 (2013.01); B62D 6/02 (2013.01)

(56) References Cited

U.S. PATENT DOCUMENTS

| | | | |
|---|---|---|---|
| 2009/0056474 A1* | 3/2009 | Watanabe | B62D 6/008 |
| | | | 73/862.193 |
| 2013/0233639 A1* | 9/2013 | Kodato | B62D 5/0463 |
| | | | 180/446 |
| 2013/0261894 A1* | 10/2013 | Kojima | B62D 5/0484 |
| | | | 701/41 |
| 2014/0074355 A1* | 3/2014 | Kim | B62D 5/0463 |
| | | | 701/41 |
| 2014/0158453 A1* | 6/2014 | Takaki | B62D 5/0463 |
| | | | 180/404 |
| 2016/0347352 A1 | 12/2016 | Yoda et al. | |

FOREIGN PATENT DOCUMENTS

| | | | | |
|---|---|---|---|---|
| JP | 2008-184049 A | 8/2008 | | |
| JP | 2011-031638 A | 2/2011 | | |
| JP | 2012-101691 A | 5/2012 | | |
| JP | 2014-051263 A | 3/2014 | | |
| JP | 2015-009682 A | 1/2015 | | |
| JP | 2015-145184 A | 8/2015 | | |
| WO | WO-2014103556 A1 * | 7/2014 | ............. | B62D 5/083 |

* cited by examiner

US 10,988,167 B2

POWER STEERING APPARATUS

TECHNICAL FIELD

This invention relates to a power steering apparatus arranged to perform an automatic steering to perform a steering assist by a hydraulic pressure supplied and discharged by opening and closing a rotary valve based on a steering torque of a driver and a driving torque of a motor.

BACKGROUND ART

There is known, for example, a conventional power steering apparatus which is described in a patent document 1, and which is configured to perform an automatic steering. An outline is explained below. This power steering apparatus is a hydraulic power steering apparatus of a rack and pinion type. This power steering apparatus includes an input shaft connected to a steering wheel; an output shaft connected through a torsion bar to the input shaft to be rotated relative to the input shaft; a rotary valve provided to an outer circumference portion of a lower end side of the input shaft between the input shaft and the output shaft; and a hollow motor provided to outer circumference portion of an upper end side of the input shaft. This power steering apparatus can perform a steering assist control and an automatic drive control based on output signals such as a vehicle speed sensor, and detection results of a torque sensor constituted by a first resolver provided to the outer circumference of the input shaft, and arranged to sense a rotation angle of the input shaft, and a second resolver provided to the outer circumference of the output shaft, and arranged to sense a rotation angle of the output shaft.

PRIOR ART DOCUMENT

Patent Document

Patent Document: Japanese Patent Application Publication No. 2005-96767

SUMMARY OF THE INVENTION

Problems which the Invention is Intended to Solve

However, in the conventional power steering apparatus, for example, when the angle sensing function of the second resolver is malfunctioned, the torque sensor cannot sense the torque accurately. The steering assist control and the automatic drive control may be appropriately performed based on this detection results.

It is, therefore, an object of the present invention to provide a power steering apparatus devised to solve the above-mentioned problems, and to obtain a rotation angle of an output shaft without depending on a sensor on the output shaft side.

Means for Solving the Problem

According to the present invention, a power steering apparatus comprises: a steering shaft including an input shaft arranged to be rotated in accordance with a steering operation of a steering wheel, an intermediate shaft connected through a first torsion bar to the input shaft, and an output shaft connected through a second torsion bar to the intermediate shaft; a hydraulic actuator including a pair of pressure chambers separated by a piston; a conversion mechanism arranged to convert a rotation movement of the steering shaft to a motion direction movement of the piston, and to transmit the steering operation of the steering wheel to steered wheels; a control valve arranged to selectively supply a hydraulic fluid supplied from a pump mounted on a vehicle in accordance with a torsion amount and a torsion direction of the second torsion bar, to the pair of the pressure chambers; an electric motor arranged to provide a rotation force to the intermediate shaft; a control unit including a microcomputer; an output shaft rotation angle presuming section provided to the control unit, and configured to presume a rotation angle of the output shaft based on a signal of a rotation angle of the input shaft, a signal of a rotation angle of the intermediate shaft, a torsion spring constant of the first torsion bar, and a torsion spring constant of the second torsion bar; and a motor drive control section provided to the control unit, and configured to control and drive the electric motor based on the rotation angle of the output shaft.

Benefit of the Invention

By the present invention, it is possible to obtain the rotation angle of the output shaft without depending on the sensor on the output shaft side.

DESCRIPTION OF EMBODIMENTS

Hereinafter, power steering apparatuses according to embodiments of the present invention are explained with reference to the drawings. Besides, the below-described embodiments exemplify that this power steering apparatus is applied to an integral type power steering apparatus used in a large vehicle and so on.

Figure 1:
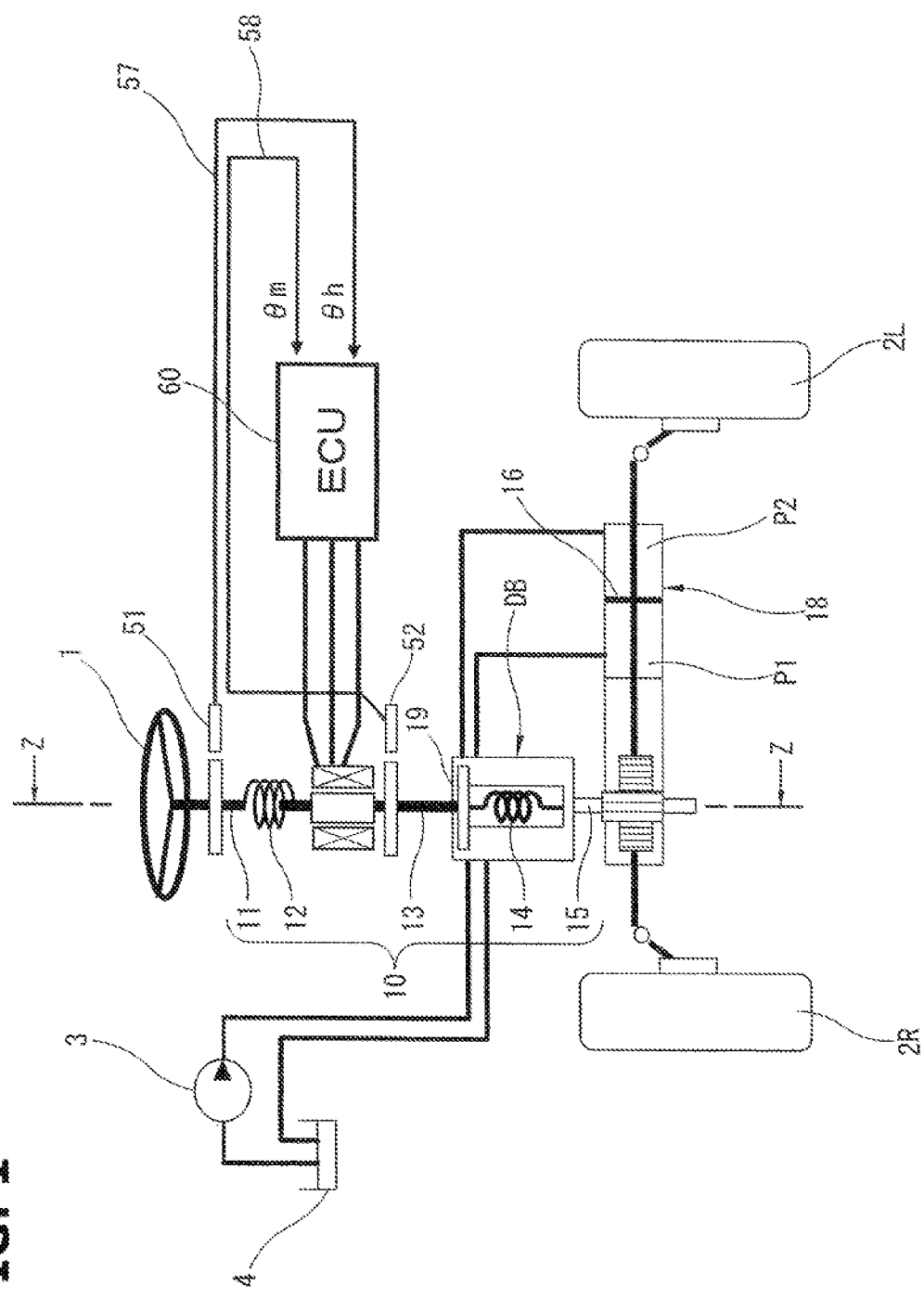
FIG. 1 is a schematic view showing a power steering apparatus according to the present invention.
Figure 2:
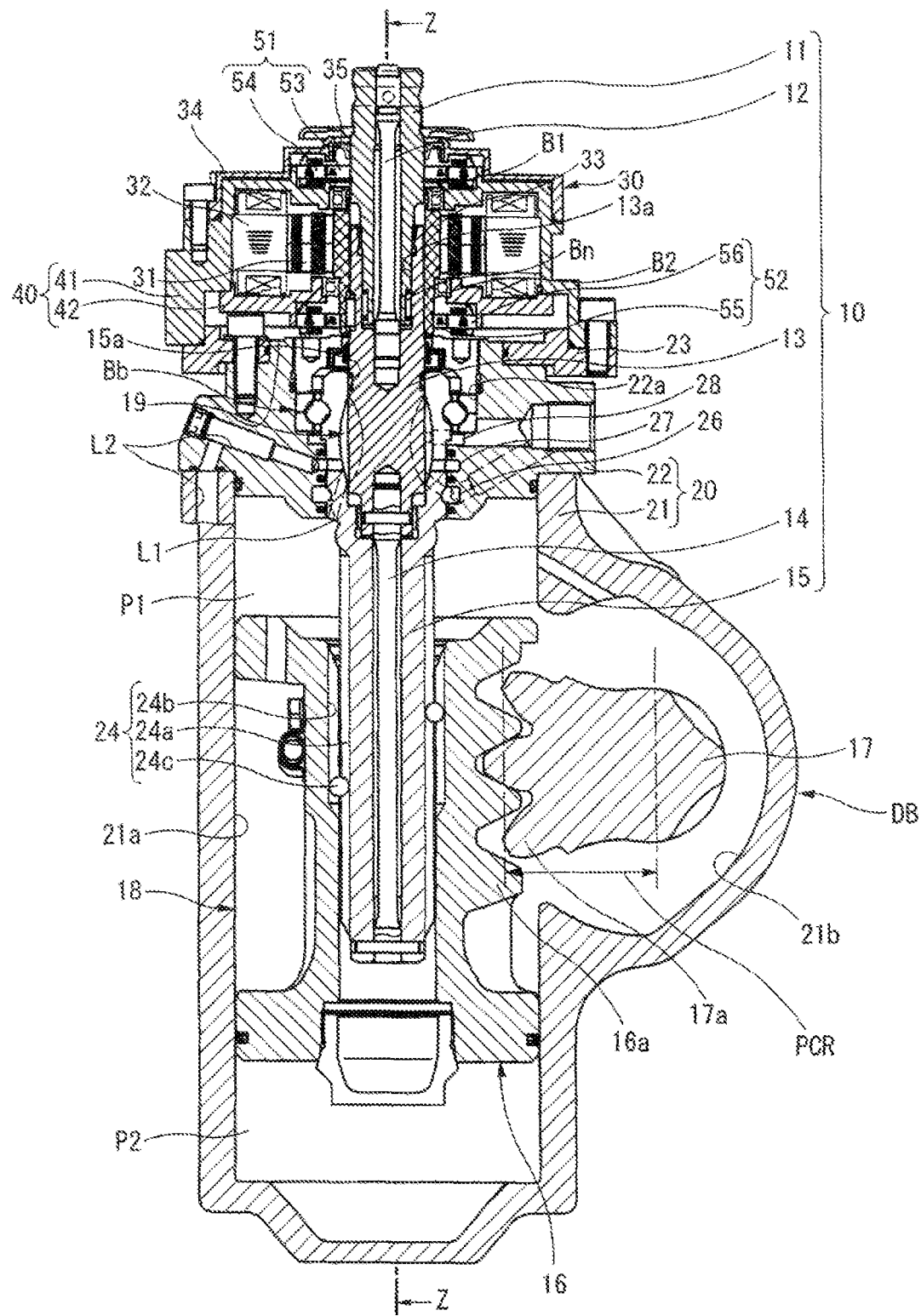
FIG. 2 is a longitudinal sectional view of the power steering apparatus.

FIG. 1 is a schematic view showing the integral type power steering apparatus. FIG. 2 is a longitudinal sectional view showing the power steering apparatus. Hereinafter, a "first end" and a "second end" are defined for explanation. The "first end" is a side linked to a steering wheel 1 in a Z direction of a rotation axis of a steering shaft 10 in the drawings. The "second end" is a side linked to a piston 16.

This power steering apparatus includes a power steering apparatus main body (hereinafter, abbreviated merely to as apparatus main body) DB including a steering wheel 10 including a first end side which extends to an outside of a housing 20, and which is connected to a steering wheel 1, and a second end side received within the housing 20, a sector shaft 17 which is a transmitting mechanism serving for a steering according to an axial movement of a piston 16 (described later) provided on an outer circumference on the second end side of the steering shaft 10, and a power cylinder 18 which is constituted by separating first and second pressure chambers P1 and P2 that are a pair of pressure chambers by the piston 16 that has a substantially cylindrical shape, and that is slidably received within the housing 20; and a control device (ECU) 60 which includes a hollow motor 30 including a rotor 31 (described later) mounted on the outer circumference of the steering shaft 10, and arranged to perform a steering assist, an automatic drive and so on by providing a rotation torque to the steering shaft 10, and electrical components such as microcomputer, which is a control unit configured to drive and control the hollow motor 30 in accordance with a steering condition and so on.

The steering shaft 10 includes an input shaft 11 which has a first end side connected to the steering wheel 1, and which is arranged to input a steering torque of a driver; an intermediate shaft 13 which includes a first end side connected through a first torsion bar 12 to the input shaft 11 to be rotated relative to the input shaft 11, and which is arranged to input a drive torque of the hollow motor 30 connected to an outer circumference of the intermediate shaft 13; and an output shaft 15 which includes a first end side connected through a second torsion bar 14 to the intermediate shaft 13 to be rotated relative to the intermediate shaft 13, and which is arranged to output the steering torque inputted from the intermediate shaft 13, to a ball screw mechanism 24 that is a conversion mechanism. This ball screw mechanism 24 includes the output shaft 15 which is a screw shaft, and which includes a ball groove 24a that is formed on an outer circumference portion of the second end side, and that is a helical groove; the piston 15 which is a nut, which is provided on the outer circumference side of the output shaft 15, and which includes a ball groove 24b that is a helical groove corresponding to the ball groove 24a, and that is formed on the inner circumference portion of the piston 16; and a plurality of balls 24c provided between the piston 16 and the output shaft 15.

The input shaft 11 has the second end portion inserted and received within an opening recessed portion 13a formed on the one end side of the intermediate shaft 13, and rotatably supported by needle bearings Bn which are bearings disposed between these overlapped portions. On the other hand, the intermediate shaft 13 is inserted and received within an opening recessed portion 15a formed in a first end side diameter increasing portion of the output shaft 15. A known rotary valve 19 is constituted between the shafts 13 and 15 at overlapped portions of the shafts 13 and 15. The rotary valve 19 is arranged to selectively supply the hydraulic fluid supplied by a pump 3 mounted on the vehicle in accordance with the torsion amount and the torsion direction of the second torsion bar 14 which are calculated from the relative rotation angle of the both shafts 13 and 15, to the first and second pressure chambers P1 and P2. Besides, the pump 3 is an engine driven pump arranged to be driven by the engine of the vehicle, to suck the hydraulic fluid within the reservoir tank 4, and to discharge that hydraulic fluid to the rotary valve 19.

The housing 20 includes a first housing 21 having a substantially cylindrical shape having a first end side opened, and a second end side closed, and defining the first and second pressure chambers P1 and P2; and a second housing 22 which is provided to close the first end side opening portion of the first housing 21, and which receives the rotary valve 19. The first and second housings 21 and 22 are tightened by a plurality of bolts (not shown) disposed at predetermined circumferential positions.

A cylinder constituting section 21a and a shaft receiving portion 21b are provided within the first housing 21. The cylinder constituting section 21a is formed along the Z direction of the rotation axis of the steering shaft 10. The shaft receiving portion 21b is formed to be substantially perpendicular to the cylinder constituting section 21a so that a part of the shaft receiving portion 21b confronts the cylinder constituting section 21a. The piston 16 linked to the second end side and the outer circumference of the output shaft 15 is received within the cylinder constituting portion 21a, so that the first pressure chamber P1 on the first end side, and the second pressure chamber P2 on the second end side are separated by the piston 16. A sector shaft 17 is received within the shaft receiving portion 21b. The sector shaft 17 includes a first axial end portion connected to the piston 16, and a second axial end portion connected through a pitman arm (not shown) to steered wheels (turning wheels) 2R and 3L.

The piston 16 and the sector shaft 17 include, respectively, teeth portions 16a and 17a which are formed on outer circumference portions, and which are arranged to be engaged with each other. The sector shaft 17 is pivoted in accordance with the axial movement of the piston 16 by the engagement of the teeth portions 16a and 17a. With this, the pitman arm is pulled in the widthwise direction of the vehicle body, so that the direction of the steered wheels 2R and 2L is varied. Besides, at this time, the hydraulic fluid within the first pressure chamber P1 is introduced into the shaft receiving portion 21b, so as to lubricate the portions between the teeth portions 16a and 17a.

The second housing 22 includes a shaft insertion hole 22a which is formed on the inner circumference of the second housing 22, into which the overlapped shafts 13 and 15 are inserted, and which penetrates in a stepped diameter decreasing shape from the first end side to the second end side in the Z direction of the rotation axis. A bearing Bb is provided to a large diameter portion of the shaft insertion hole 22a on the first end side. The bearing Bb rotatably supports the output shaft 15. On the other hand, a small diameter portion of the shaft insertion hole 22a on the second end side includes an introduction port 26 connected to the pump 3; a supply and discharge port 27 arranged to supply or discharge the hydraulic pressure introduced from the introduction port 26 to or from the pressure chambers P1 and P2; and a discharge port 28 arranged to discharge the hydraulic fluid discharged from the pressure chambers P1 and P2 through the supply and discharge port 27, to the reservoir tank 4. Besides, the supply and discharge port 27 is connected to the first pressure chamber P1 through a first supply and discharge passage L1 provided to the first end side diameter increasing portion of the output shaft 15. Moreover, the supply and discharge port 27 is connected to the second pressure chamber P2 through a second supply and discharge passage L2 provided within the first housing 21, and so on.

By the above-described configuration, when the steering wheel 1 is steered, the power steering apparatus supplies the hydraulic pressure pressurized and transferred by the pump 3 through the rotary valve 19 to one of the pressure chambers P1 and P2 according to the steering direction, and discharges the hydraulic fluid (the redundant amount) corresponding to the supply amount, from the other of the pressure chambers P1 and P2, to the reservoir tank 4, so that the piston 16 is driven by the hydraulic pressure. Consequently, the assist torque based on the hydraulic pressure acted to the piston 16 is provided to the sector shaft 17.

The hollow motor 30 is a three-phase alternating current type brushless motor. The hollow motor 30 includes a motor element including a motor rotor 31 mounted on the outer circumference portion of the intermediate shaft 13 extending to the outside of the housing 20 through a connection member (joint member) 33 having a substantially cylindrical shape, and arranged to rotate as a unit with the intermediate shaft 13, and a motor stator 32 disposed through a predetermined gap on an outer circumference side of the motor rotor 31, and electrically connected to the outside control device 60; a motor housing 40 having a substantially cylindrical shape, and including a first end side in which the motor element is received, and a second end side fixed through an adapter member 23 to the housing 20 (the second housing 22); a first bearing B1 and a second bearing B2 which are received and held within the motor housing 40, and which rotatably support the first end side and the second end side of the connection member 33, respectively; and a first resolver 51 which is a first rotation angle sensor disposed on the first end side of the motor housing 40 that is the first end side of the motor element, and which is arranged to sense the rotation angle of the input shaft 11; a second resolver 52 which is a second rotation angle sensor, which is disposed to the second end side of the motor housing 40 that is the second end side of the motor element, and which is arranged to sense the rotation angle of the intermediate shaft 13; a cover member 34 which is arranged to close the first end side opening portion of the motor housing 40, and thereby to protect the installed components such as the first resolver 51; and a seal member 35 liquid-tightly seals between the cover member 34 and the input shaft 11.

The motor housing 40 is made from a predetermined metal such as the aluminum alloy. The motor housing 40 has a two divided structure. The motor housing 40 includes a first motor housing 41 which is a cylindrical portion, which receives the first bearing B1 and the first resolver on the inner circumference portion of the first end side of the first motor housing 41, and which receives the motor element on the inner circumference portion of the second end side of the first motor housing 41; and a second motor housing 42 which closes the second end side opening portion of the first motor housing 41, and which receives the second bearing B2 and the second resolver 52 on the inner circumference portion of the second motor housing 42.

The first resolver 51 includes a first resolver rotor 53 mounted on the outer circumference of the input shaft 11, and arranged to rotate as a unit with the input shaft 11; and a first resolver stator 54 disposed radially outside the first resolver rotor 53, and arranged to sense a rotation position of the first resolver rotor 53. The first resolver stator 54 is electrically connected through a first sensor output wire 57 to the control device 60, so as to output the sensing results to the control device 60.

The second resolver 52 includes a second resolver rotor 55 mounted on the outer circumference of the connection member (joint member) 33 to rotate as a unit with the connection member 33; and a second resolver stator 56 disposed radially outside the second resolver rotor 55, and arranged to sense the rotation position of the second resolver rotor 55. The second resolver 52 is arranged to sense the rotation angle of the connection member 33 rotating in synchronism with the intermediate shaft 13, and thereby to sense the rotation position of the motor rotor 31.

The second resolver stator 56 is electrically connected through a second sensor output wire 58 to the control device 60 so as to output the sensing results to the control device 60.

The control device 60 performs various control operations such as a steering assist control to control and drive the hollow motor 30 in accordance with the manual steering state of the driver, and an automatic drive control to control and drive the hollow motor 30 based on the information from various sensors, radars, cameras, and predetermined driving information grasping means (not shown), at the parking, the lane keeping and so on.

Figure 3:
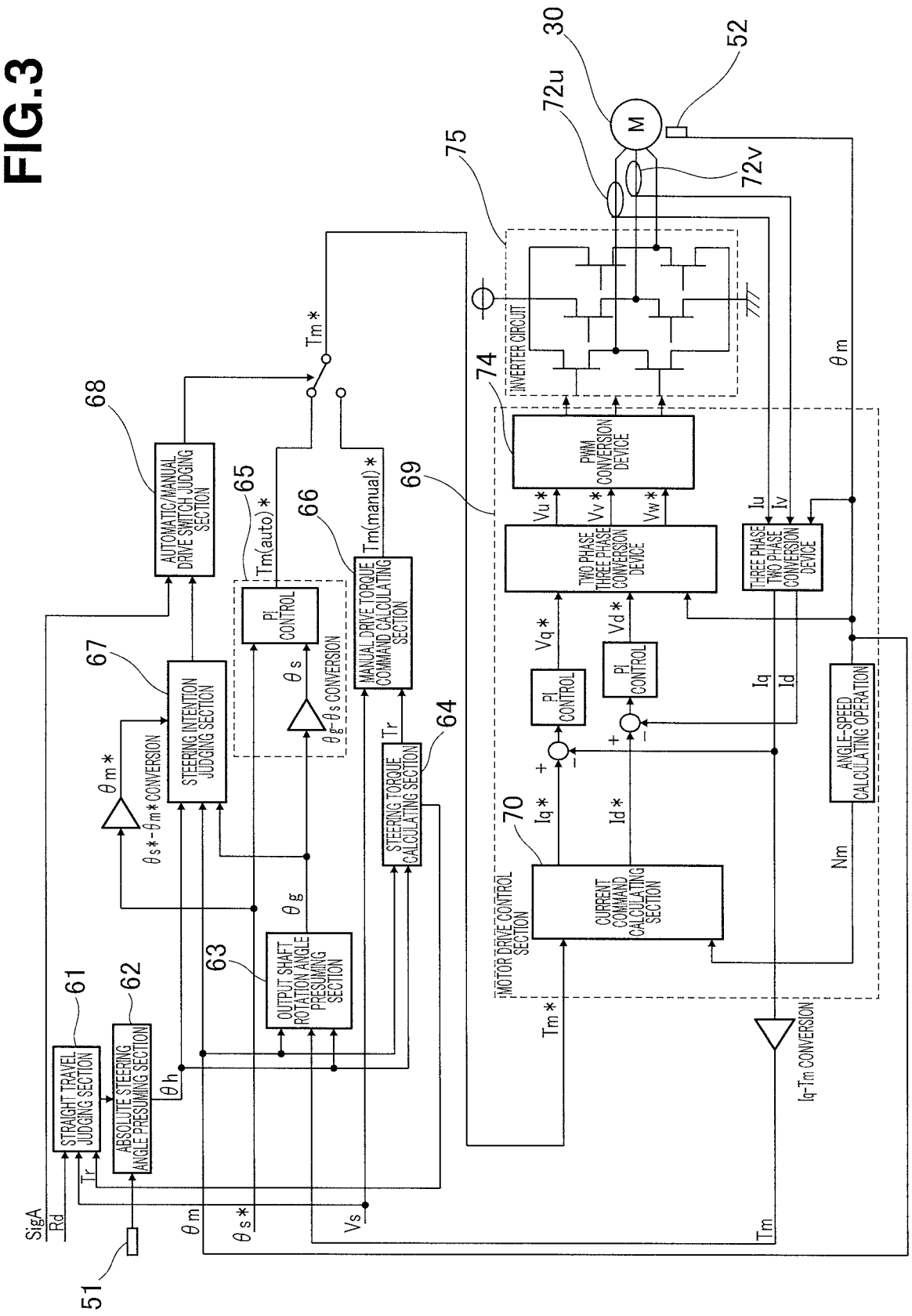
FIG. 3 is a control block diagram showing a calculation circuit configuration of a control device according to a first embodiment of the present invention.

FIG. 3 is a control block diagram showing a calculation circuit configuration of the control device 60.

The control device 60 includes a straight travel judging section 61 configured to judge whether or not the vehicle is traveling in a straight manner; an absolute steering angle presuming section 62 configured to presume an input shaft rotation angle θh which is an absolute steering angle of the steering wheel 1 on the basis of the sensing value of the first resolver 51 when the straight travel judging section 61 judges that the vehicle is travelling in the straight manner; a steering torque calculating section 64 configured to calculate a steering torque Tr inputted to the steering wheel 1; an automatic drive torque command calculating section 65 configured to calculate an automatic drive torque command value Tm(auto)* which is a motor torque command at the automatic drive; a manual drive torque command calculating section 66 configured to calculate a manual drive torque command value Tm(manual)* which is a motor torque command value at the manual drive; a steering intention judging section 67 configured to judge whether or not the driver has a steering intension at the automatic drive; an automatic/manual drive switch judging section 68 serving for the switching of the automatic drive and the manual drive; and a motor drive control section 69 configured to control and drive the hollow motor 30 based on the motor torque command value Tm(auto)* or Tm(manual)*.

The straight travel judging section 61 is configured to judge whether or not the vehicle is traveling in the straight manner based on a rotation speed difference Rd between the pair of the steered wheels 2R and 2L, and the vehicle speed Vs which are inputted to the control device 60, and the steering torque Tr calculated by the steering torque calculating section 64.

Specifically, the straight travel judging section 61 is configured to judge that the vehicle is traveling in the straight manner only when the vehicle speed Vs is equal to or greater than a predetermined value, when the rotation speed difference Rd of the pair of the steered wheels 2R and 2L is equal to or smaller than a predetermined value near 0, and when the steering torque Tr is equal to or smaller than a predetermined value near 0. Then, the straight travel judging section 61 outputs the judging result to the absolute steering angle presuming section 62.

The absolute steering angle presuming section 62 is configured to learn the sensing value of the first resolver 51 when receiving the signal indicative that the vehicle is traveling in the straight manner from the straight travel judging section 61, as a neutral position of the steering wheel 1, that is, a reference position at which the input shaft rotation angle θh becomes 0 degree. The absolute steering angle presuming section 62 is configured to presume the input shaft rotation angle θh which is the absolute steering angle of the steering wheel 1 corresponding to the steered angle of the steered wheels 2R and 2L, based on the variation amount of the detection value of the first resolver 51 from the reference position, that is, the rotation amount of the input shaft 11. Besides, it is possible to obtain the absolute angle of the intermediate shaft rotation angle θm by correcting the detection value of the second resolver 52 based on the relative rotation angle of the first resolver 51 and the second resolver 52.

Figure 4:
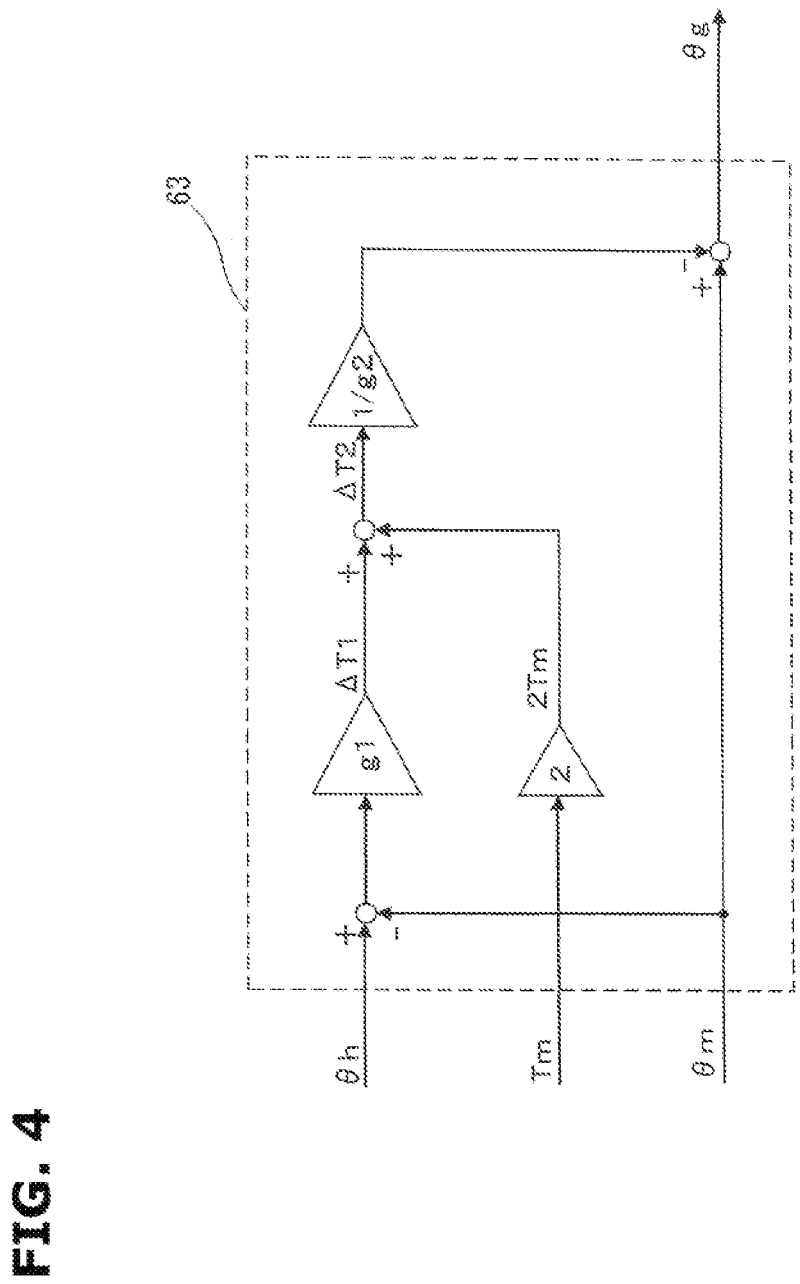
FIG. 4 is a block diagram showing details of an output shaft rotation angle presuming section according to the first embodiment.

The output shaft rotation angle presuming section 63 is configured to presume the output shaft rotation angle θg based on the presuming formula (formula (6) described later) of the output shaft rotation angle θg described later, from the input shaft rotation angle θh, the intermediate shaft rotation angle θm, and the motor torque Tm obtained by multiplying a predetermined torque constant to the q-axis motor actual current Iq derived by a three phase two phase conversion device 71 (described later) of a motor drive control section 69 (cf. FIG. 4).

Hereinafter, a derivation process of the presuming formula of the output shaft rotation angle θg is shown.

Firstly, the output shaft rotation angle θg is a value obtained by subtracting the torsion angle of the second torsion bar 14 from the intermediate shaft rotation angle θm. Accordingly, in a case where the torsion torque of the second torsion bar 14 is ΔT2, and where the torsion spring constant of the second torsion bar 14 is g2, the output shaft rotation angle θg is represented by the following formula (1).

[formula 1]

$$\theta g = \theta m - \frac{\Delta T2}{g2} \quad (1)$$

The torsion torque ΔT2 of the second torsion bar 14 is obtained by subtracting the torque acted to the downstream side of the second torsion bar 14, that is, the gear torque Tg generated in the output shaft 15 rotated to follow the intermediate shaft 13 rotated based on the torque Th and Tm, from the torque acted to the upstream side (the side of the steering wheel 1) of the second torsion bar 14, that is, a summation of the steering torque Th which is torque generated in the input shaft 11, and the motor torque Tm which is provided to the intermediate shaft 13 by the hollow motor 30. That is, the torsion torque ΔT2 is represented by the following formula (2).

[formula 2]

$$\Delta T2 = Th + Tm - Tg \quad (2)$$

In the following, the torsion torque ΔT1 of the first torsion bar 12 is considered. The torsion torque ΔT1 is obtained by the gear torque Tg and the motor torque Tm which are acted to the downstream side of the first torsion bar 12, from the steering torque Th acted to the upstream side of the first torsion bar 12. The torsion torque ΔT1 of the first torsion bar 12 is represented by the following formula (3).

[formula 3]

$$\Delta T1 = Th - Tm - Tg \quad (3)$$

The torsion torque ΔT2 of the second torsion bar 14 can be also represented by the following formula (4) from the formula (2) and the formula (3).

[formula 4]

$$\Delta T2 = \Delta T1 + 2Tm \quad (4)$$

In this case, the torsion torque ΔT1 of the first torsion bar 12 can be also represented by the following formula (5) based on the input shaft rotation angle θh, the intermediate shaft rotation angle θm, and the torsion spring constant g1 of the first torsion bar 12.

[formula 5]

$$\Delta T1 = g1 \times (\theta h - \theta m) \quad (5)$$

By applying the formula (4) and the formula (5) to the formula (1), it is possible to obtain the following formula (6) which is the presuming formula of the output shaft rotation angle θg.

[formula 6]

$$\theta g = \theta m - \frac{g1 \times (\theta h - \theta m) + 2Tm}{g2} \quad (6)$$

In this case, in the formula (6), the torsion spring constants g1 and g2 of the first and second torsion bars 12 and 14 are known values. Accordingly, it is possible to presume the output shaft rotation angle θg by merely obtaining the input shaft rotation angle θh, the intermediate shaft rotation angle θm, and the motor torque Tm.

In this way, the output shaft rotation angle presuming section 63 presumes the output shaft rotation angle θg based on the captured signals of the input shaft rotation angle θh, the intermediate shaft rotation angle θm, and the motor torque Tm.

The steering torque calculating section 64 is configured to calculate the steering torque Tr inputted to the steering wheel 1 by the driver, by multiplying the torsion spring constant g1 of the first torsion bar 12 to the difference between the input shaft rotation angle θh and the intermediate shaft rotation angle θm (the difference between the detection value of the first resolver 51 and the detection value of the second resolver 52).

The automatic drive torque command calculating section 65 is configured to calculate the automatic drive torque command value Tm (auto)* from the steered angle command θs* calculated by a control unit and so on which is different from the control device 60 based on the information obtained by the various sensors, the radars, the cameras, and the predetermined drive information grasping means, and the output shaft rotation angle θg presumed by the output shaft rotation angle presuming section 63.

The manual drive torque command calculating section 66 is configured to calculate the manual drive torque command value Tm (manual)* based on the steering torque Tr calculated by the steering torque calculating section 64, and the vehicle speed Vs.

The steering intension judging section 67 is configured to judges whether or not the drive has the steering intension at the automatic drive, from the signals of the input shaft rotation angle θh, the intermediate shaft rotation angle θm, and the output shaft rotation angle θg, or the motor rotation angle control target θm* calculated based on the steered angle command θs*. In this embodiment, the steering intension judging section 67 is configured to judge the steering intension based on the signals of the input shaft rotation angle θh and the intermediate shaft rotation angle θm.

In the following, the phases of the input shaft rotation angle θh and the intermediate shaft rotation angle θm at the automatic drive, that is, when there is no input from the driver to the steering wheel 1, and the phases of the input shaft rotation angle θh and the intermediate shaft rotation angle θm when the driver steers the steering wheel 1 are compared. For the structure of the steering shaft 10, in the former, the hollow motor 30 mainly performs the steering operation. Accordingly, the input shaft 11 is pivoted to be driven by the intermediate shaft 13. The phase of the intermediate shaft rotation angle θm precedes (antecedes) the phase of the phase of the input shaft rotation angle θh. On the other hand, in the latter, the input of the hollow motor 30 is overridden (overwrote) by the input of the driver. Accordingly, the intermediate shaft 13 is pivoted to be driven by the input shaft 11. Consequently, the phase of the input shaft rotation angle θh precedes (antecedes) the phase of the intermediate shaft rotation angle θm.

Figure 5:
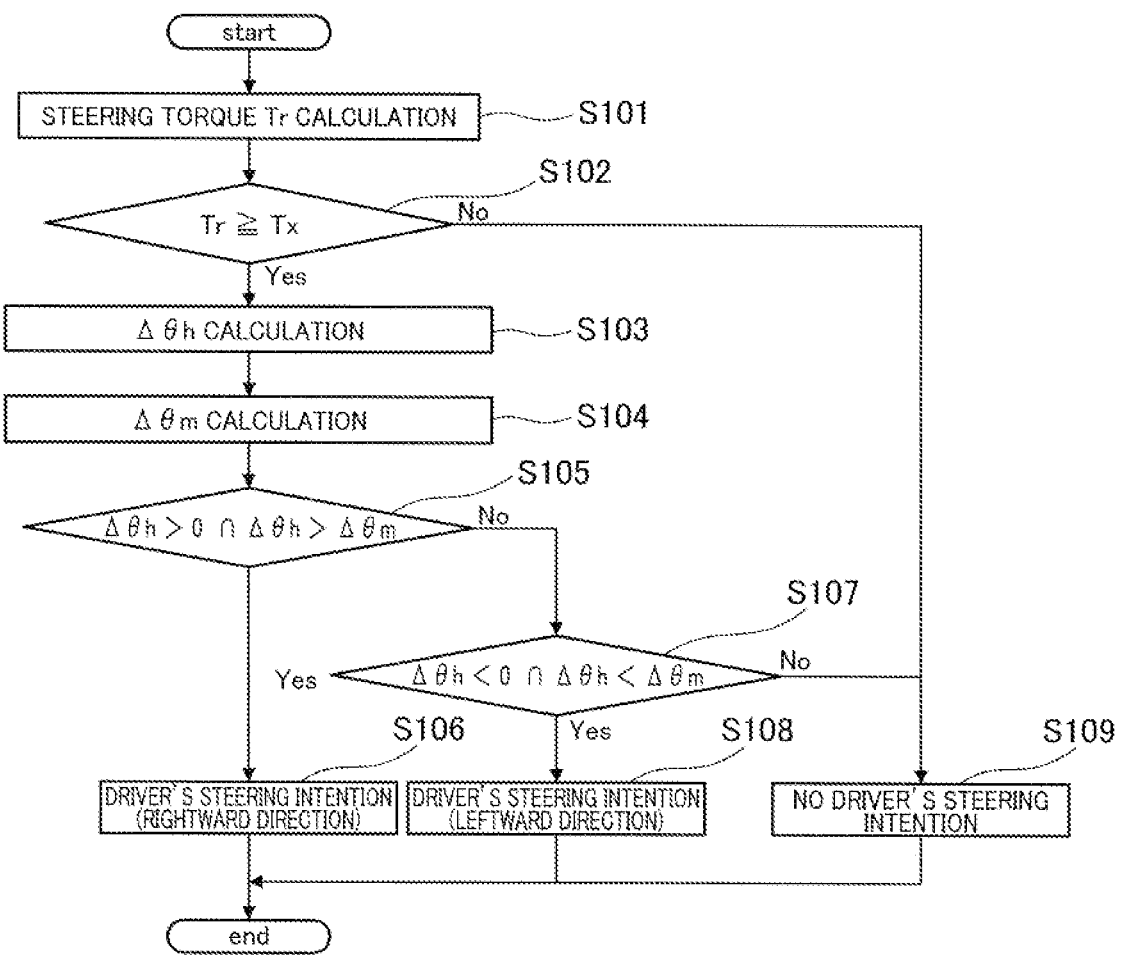
FIG. 5 is a flow chart showing a steering intention judgment operation of a steering intention judging section according to the first embodiment.

In consideration of the above matter, the steering intension judging section 67 is configured to judge that the driver has the steering intension when the phase of the input shaft rotation angle θh precedes the phase of the intermediate shaft rotation angle θm. Specifically, the steering intention judging section 67 judges the steering intension based on the flow chart shown in FIG. 5.

Besides, various rotation angle signals such as the input shaft rotation angle θ and the intermediate shaft rotation angle θm, the angular speed derived from the rotation angle signals, and so on are represented in the following manner. A positive value represents a case where it is acted in a direction where the steered wheels 2R and 2L are steered (turned) in the rightward direction. A negative value represents a case where it is acted in a direction where the steered wheels 2R and 2L are steered (turned) in the leftward direction.

That is, in the steering intension judgment flow in the steering intension judgment section 67 according to this embodiment, firstly, the steering torque Tr is calculated in the manner identical to that of the steering torque calculating section 64 (step S101). It is judged whether or not this steering torque Tr is equal to or greater than a predetermined value Tx (step S102). In case of No judgement, it is judged that the driver has no steering intention (step S109). The steering intention judgment process is finished. On the other hand, in case of Yes judgment, the input shaft rotation angle θh and the intermediate shaft rotation angle θm are time-differentiated (differentiated by time) so as to calculate the input shaft angular speed Δθh and the intermediate shaft angular speed Δθm (steps S103 and S104). The process proceeds to step S105.

At step S105 and step S107 described later, it is judged whether or not the phase of the input shaft rotation angle θh precedes the phase of the intermediate shaft rotation angle θm.

That is, at step S105, it is judged whether or not the input shaft angular speed Δθh inputted to the steering wheel 1 based on the steering operation of the steering wheel 1 by the driver is greater than 0, and greater than the intermediate shaft angular speed Δθm inputted from the hollow motor 30 to the intermediate shaft 30. That is, it is judged whether or not the phase of the input shaft rotation angle θh precedes the phase of the intermediate shaft rotation angle θm in the rightward direction (clockwise direction) of the rotation shaft Z. In case of Yes judgment, it is judged that the driver has the steering intention, and steers the steering wheel 1 in the rightward direction (step S106). The process is finished. In case of No judgment, the process proceeds to step S107. Then, at step S107, it is judged whether or not the input shaft angular speed Δθh is smaller than 0, and smaller than the intermediate shaft angular speed Δθm. That is, it is judged whether or not the phase of the input shaft rotation angle θh precedes the phase of the intermediate shaft rotation angle θm in the leftward direction (counterclockwise direction) of the rotation axis Z. In case of the Yes judgment, it is judged that the driver has the steering intention, and steers the steering wheel 1 in the leftward direction (step S108). In case of No judgment, it is judged that the driver has no steering intention (step S109). The process is finished.

The automatic/manual drive switch judging section 68 is basically configured to perform the manual drive when the signal SigA requesting the automatic drive is not inputted, and to perform the automatic drive when the signal SigA is inputted. However, even when the signal SigA is inputted, the automatic/manual drive switch judging section 68 is configured to switch to the manual drive when the steering intention judging section 67 judges that the driver has the steering intension.

In the motor drive control section 69, firstly, a current command calculating section 70 is configured to calculate d-axis, q-axis current command values Id*, Iq* from the motor torque command value Tm* (the automatic drive torque command value Tm (auto)* or the manual drive torque command value Tm (manual)*), and the motor rotation speed Nm calculated based on the intermediate shaft rotation angle θ which is the rotation angle of the hollow motor 30 (the intermediate shaft 13) outputted from the second resolver 52. Moreover, at the same time, in the motor drive control section 69, a three phase two phase conversion device 71 is configured to obtain d-axis, q-axis motor actual currents Id, Iq from the intermediate shaft rotation angle θm, and the u-phase, v-phase motor actual currents Iu, Iv outputted from the motor current sensing sections 72u, 72v configured to sense the actual currents flowing the hollow motor 30.

Next, the motor drive control section 69 is configured to calculate values necessary for the d-axis, q-axis motor actual currents Id, Iq to follow the d-axis, q-axis current command values. That is, the motor drive control section 69 is configured to calculate a difference between the d-axis current command value Id* and the d-axis motor actual current Id, and a difference between the q-axis current command value Iq* and the q-axis motor actual current Iq. Then, the motor drive control section 69 is configured to obtain the d-axis, q-axis voltage command values Vd* and Vq* by performing the PI control to the calculated differences. Then, a two phase three phase conversion device 73 calculates U phase, V phase, W phase voltage command values Vu*, Vv*, Vw* from the d-axis, q-axis voltage command values Vd*, Vq* and the intermediate shaft rotation angle θm. Then, a PWM conversion device 74 coverts these voltage command values Vu*, Vv*, Vw* from the analogue waveform to the PWM waveform. This is outputted to an inverter circuit 75. The motor drive control section 59 controls and drives the hollow motor 30 through this inverter circuit 75.

Operations and Effects in this Embodiment

In the conventional power steering apparatus including the resolver which is provided to the output shaft side, and arranged to sense the rotation angle, as described above, when the angle sensing function of the resolver on the output shaft side is malfunctioned, the steering assist control and the automatic drive control may not be appropriately performed. The resolver and the electric motor are necessarily disposed to be apart from each other. Accordingly, the electric wire for connecting the resolver and the electric motor becomes long, so that the wiring operation of the electric wire may be complicated. The layout characteristic of the electric wire may be deteriorated.

Moreover, the calibration of the relative angle between the resolver on the input shaft side and the resolver on the output shaft side cannot be performed before the assembling operation of the power steering device is finished. Accordingly, the manufacturing process may be complicated.

Moreover, in the power steering apparatus of the integral type like this embodiment, the output shaft is surrounded by the hydraulic chambers, so that the resolver is difficult to be provided to the output shaft side in the structure. In a case where the rotation angle of the output shaft is presumed from the rotation angle of the sector shaft, the resolution power of the angle is rough since the sector shaft has the large gear ratio with respect to the output shaft. Accordingly, it is difficult to accurately calculate the rotation angle of the output shaft.

Contrary to this, in the power steering apparatus according to this embodiment, the steering shaft 10, the input shaft 11, the intermediate shaft 13, and the output shaft 15 are connected (linked) by the two torsion bars 12 and 14. The first and second resolvers 51 and 52 are provided, respectively, to the input shaft 11 and the intermediate shaft 13. Moreover, the output shaft rotation angle presuming section 63 provided to the control device 60 is configured to presume the output shaft rotation angle θg which is the rotation angle of the output shaft 15 from the signals of the input shaft rotation angle θh and the intermediate shaft rotation angle θm which are sensed by the first and second resolvers 51 and 52, and the torsion spring constants g1 and g2. With this, in this embodiment, it is possible to perform the automatic drive control by using the output shaft rotation angle θg by the control device 60 without providing the sensor such as the resolver to the output shaft 15 side.

Accordingly, it is possible to suppress the generation of the above-described problems such as the complication of the wiring operation based on the elongation of the electric wire, and the deterioration of the layout characteristics. Moreover, the first and second resolvers 51 and 52 are received within the hollow motor 30. Consequently, it is possible to perform the calibration of the relative positions before the assembly operation of the power steering apparatus. Furthermore, in the integral type power steering apparatus like this embodiment, it is possible to readily obtain the output shaft rotation angle θg.

Moreover, in this embodiment, the control device 60 includes the steering intention judging section 67. The steering intention judging section 67 is configured to judge whether or not the driver has the steering intention. Accordingly, when it is judged that the driver has no steering intention, the automatic drive control is continued. When it is judged that the driver has the steering intention, the operation is immediately switched to the manual drive. In this way, it is possible to perform the smooth switch control of the drive state.

Furthermore, when the driver steers the steering wheel 1, the phase of the input shaft rotation angle θh precedes the phase of the intermediate shaft rotation angle θm. In this embodiment, this structural characteristics of the steering shaft 10 is used for the judgment standards (criteria) of the steering intention judgment by the steering intention judging section 67. Accordingly, it is possible to judge whether or not the driver has the steering intention with the high accuracy.

Moreover, in this embodiment, the straight travel judging section 61 and the absolute steering angle presuming section 62 are configured to judge the input shaft rotation angle θh which is the absolute steering angle of the steering wheel 1, from the detection value of the first resolver 51. Accordingly, it is unnecessary to use the absolute steering angle sensor arranged to sense the absolute steering angle. Consequently, it is possible to decrease the number of the components, and to decrease the manufacturing cost.

Furthermore, in this embodiment, the hollow motor 30 provided to surround the intermediate shaft 13 is employed as the electric motor which serves for the steering assist, the automatic drive, and so on. Accordingly, it is possible to decrease the size of the power steering apparatus, relative to a case of employing the electric motor arranged to transmit the rotational force through a speed reduction device and so on to the intermediate shaft 13.

By the way, in general, the power steering apparatus using the ball screw mechanism 24 for transmitting the power between the output shaft 15 and the piston 16 like this embodiment is often mounted on the large and heavy weight vehicle such as the track and the bus. By this embodiment, it is possible to add the steering assist function such as the automatic drive to the large and heavy weight vehicle. Consequently, it is possible to remarkably improve the safety of these vehicles.

Besides, in this embodiment, the steering intention judging section 67 is configured to judge whether or not the driver has the steering intention based on the signals of the input shaft rotation angle θh and the intermediate shaft rotation angle θm. However, it is possible to similarly judge the steering intension by replacing intermediate shaft rotation angle θm by the output shaft rotation angle θg which is the rotation angle of the output shaft 15.

Moreover, in this embodiment, the input shaft rotation angle θh is directly calculated by inputting the detection value of the first resolver 51 to the absolute steering angle presuming section 62. However, the intermediate shaft rotation angle θm is previously set to the absolute angle by inputting the detection value of the second resolver 52 to the absolute steering angle presuming section 62. Then, it is optional to indirectly calculate the input shaft rotation angle θh which is the absolute steering angle, based on the relative rotation angle of the first and second resolvers 51 and 52, from this intermediate shaft rotation angle θm.

Second Embodiment

Figure 6:
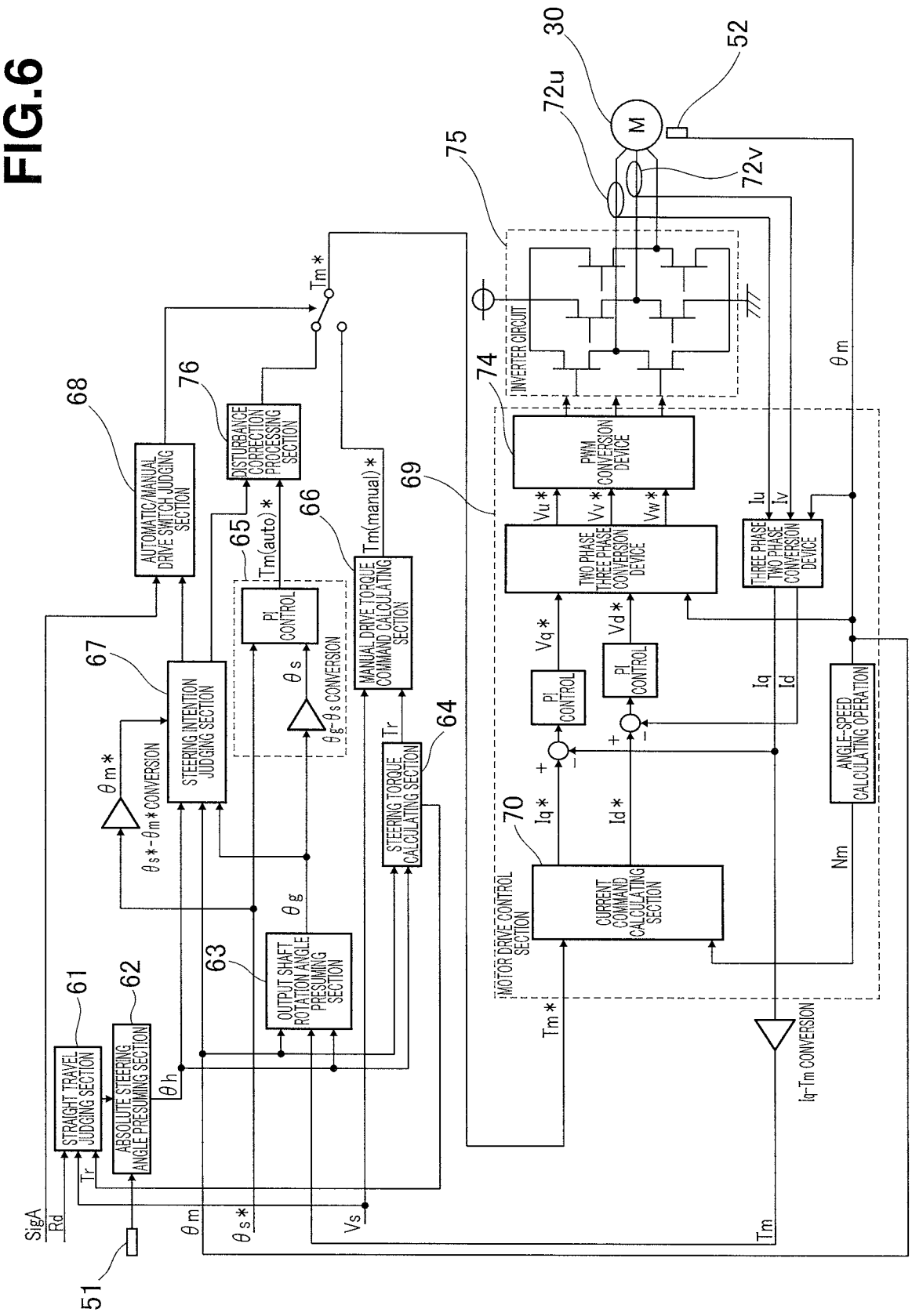
FIG. 6 is a control block diagram showing a calculation circuit configuration of a control device according to a second embodiment of the present invention.

In a second embodiment shown in FIG. 6, the steering intention judging section 67 includes a function to judge whether or not there is a disturbance from the road surface such as the road surface vibration, in addition to the configuration of the first embodiment. Moreover, the control device 60 includes a disturbance correction processing section 76 configured to correct the automatic drive torque command value Tm (Auto)*, based on the judgment result of the steering intention judging section 67. Besides, in this embodiment, the configurations identical to those of the first embodiment has the same symbols. With this, the concrete explanations are omitted (the same is applied to below-described embodiment).

Figure 7:
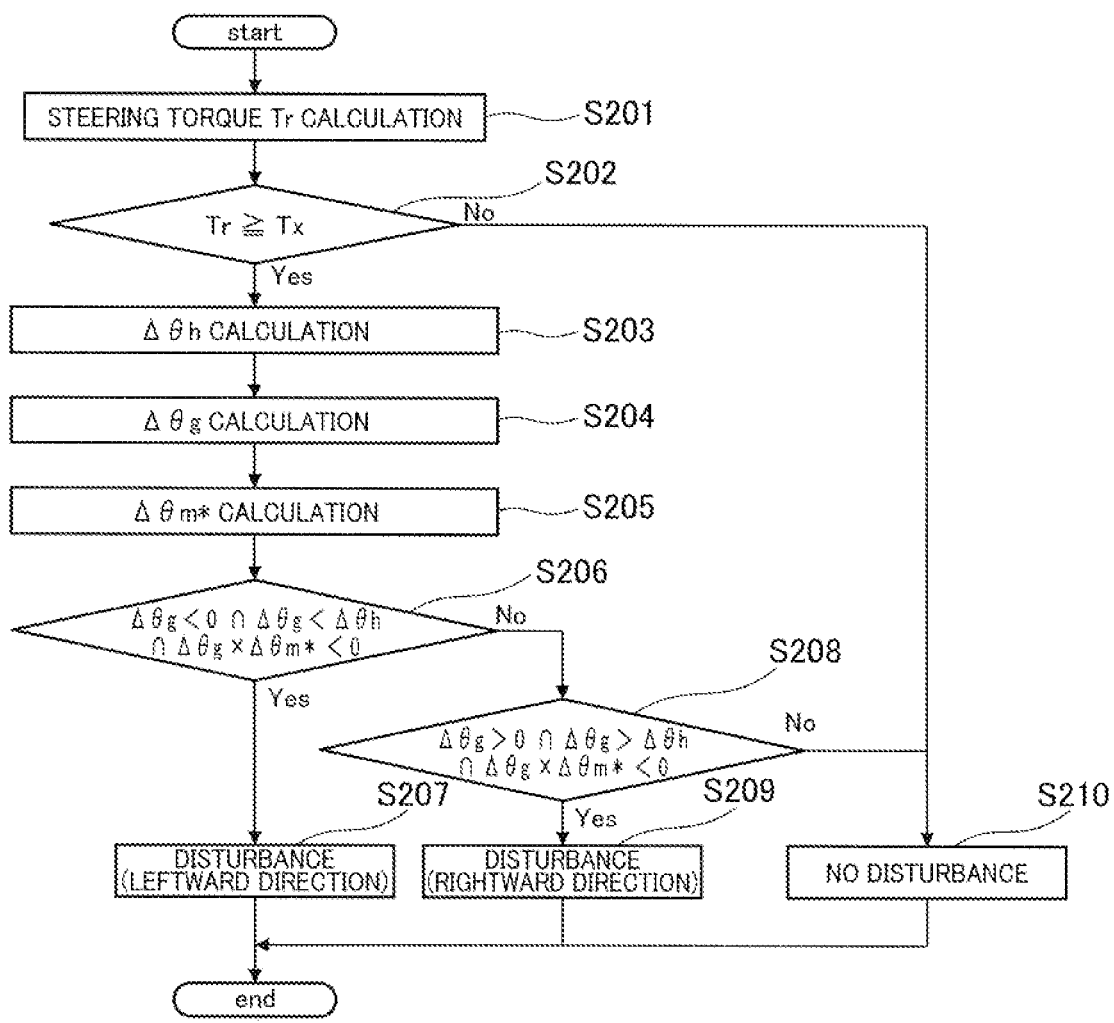
FIG. 7 is a flow chart showing a disturbance judgment operation of a steering intention judging section according to the second embodiment.

That is, the steering intention judging section 67 according to this embodiment is configured to judge the steering intention at the automatic drive based on the input shaft rotation angle θh and the intermediate shaft rotation angle θm. Moreover, the steering intention judging section 67 is configured to judge whether or not there is the disturbance from the road surface by a flow chart shown in FIG. 7, based on the input shaft rotation angle θh, the intermediate shaft rotation angle θm, the output shaft rotation angle θg, and the motor rotation angle control target θm*.

That is, in this flow, firstly, the steering torque Tr is calculated based on the input shaft rotation angle θh and the intermediate shaft rotation angle θm (step S201). It is judged whether or not this steering torque Tr is equal to or greater than a predetermined value Tx (step S202). In case of No judgment, it is judged that the disturbance from the road surface is not generated (step S210). The operations of the steering intention judging section 67 is finished. On the other hand, in case of Yes judgment, the input shaft rotation angle θh, the output shaft rotation angle θg, and the motor rotation angle control target θm* are time-differentiated (differentiated by time) to calculate the input shaft angular speed Δθh, the output shaft angular speed Δθg, and the motor angular speed control target Δθm* (step S203 to S205). The process proceeds to step S206.

At step S206, it is judged whether or not the output shaft angular speed Δθg is smaller than 0, and smaller than the input shaft angular speed Δθh, that is, whether or not the phase of the output shaft rotation angle θ$_g$ precedes the phase of the input shaft rotation angle θh in the leftward direction (counterclockwise direction) of the rotation axis Z. Moreover, it is judged whether or not the rotation direction of the output shaft 15 is not identical to the drive direction of the hollow motor 30, that is, whether or not a positive or negative symbol of the output shaft angular speed Δθg is not identical to a positive or negative symbol of the motor angular speed control target Δθm* (Δθg×Δθm*<0). In case of Yes judgment, it is judged that although the automatic drive is continued by the hollow motor 3D without the driver's steering intention, the output shaft 15 is rotated in the direction where the steered wheels 2R and 2L are steered (turned) in the leftward direction, by the disturbance from the road surface against the drive direction of the hollow motor 30. That is, it is judged that the output shaft 15 is rotated in the leftward direction with respect to the rotation axis Z by the influence of the disturbance (step S207). The disturbance judgment operation is finished. On the other hand, in case of No judgment, the process proceeds to step S208.

At step S208, it is judged whether or not the output shaft angular speed Δθg is greater than 0, and greater than the input shaft angular speed Δθh. That is, it is judged whether or not the phase of the output shaft rotation angle θg precedes the phase of the input shaft rotation angle θh in the rightward direction (clockwise direction) of the rotation axis, and whether or not the positive or negative symbol of the output shaft angular speed Δθg is not identical to the positive or negative symbol of the motor angular speed control target Δθm* (Δθg×Δθm*<0). In case of Yes judgment, it is judged that although the automatic drive is continued by the hollow motor 30 without the driver's steering intention, the output shaft 15 is rotated in the direction where the steered wheels 2R and 2L are steered in the rightward direction, by the disturbance from the road surface against the drive direction of the hollow motor 30. That is, it is judged that the output shaft 15 is rotated in the rightward direction with respect to the rotation axis Z by the influence of the disturbance (step S209). In case of No judgment, it is judged that the disturbance from the road surface is not generated (step S210). Consequently, the respective disturbance processes are finished.

When the steering intention judging section 67 judges that the disturbance in the rightward direction (the clockwise direction) is generated in the output shaft 15, the disturbance correction processing section 76 is configured to correct the automatic drive torque command value Tm (auto)* to increase the steering torque of the output shaft 15 in the leftward direction (the counterclockwise direction). On the other hand, when the steering intention judging section 67 judges that the disturbance in the leftward direction (the counterclockwise direction) is generated in the output shaft 15, the disturbance correction processing section 76 is configured to correct the automatic drive torque command value Tm (auto)* to increase the steering torque of the output shaft 15 in the rightward direction (the clockwise direction). That is, the disturbance correction processing section 76 is configured to correct the automatic drive torque command value Tm (auto)* to counteract the influence of the disturbance generated in the output shaft 15. Besides, the correction value used for the correction of the automatic drive torque command value Tm (auto)* may be a fixed value previously obtained by a vehicle test and so on, and may be a variable value calculated from the phase difference between the intermediate shaft rotation angle θm and the output shaft rotation angle θg, and so on.

Accordingly, in this embodiment, it is possible to attain the same effects and operations as the first embodiment. Moreover, the steering intension judging section 67 can judge the disturbance from the road surface. Accordingly, it is possible to judge whether the variation of the output shaft rotation angle θg and so on at the automatic drive is generated based on the steering intention of the driver, or due to the influence of the disturbance. With this, it is possible to suppress the problem in which the driving state is suddenly switched from the automatic drive to the manual drive by erroneously judging the influence of the disturbance from the road surface as the steering intention of the driver. Consequently, it is possible to improve the safety of the vehicle.

Furthermore, in this embodiment, the control device 60 includes the disturbance correction processing section 76. This disturbance correction processing section 76 is configured to suppress the influence of the disturbance from the road surface at the automatic drive. Accordingly, it is possible to further improve the safety at the automatic drive.

Figure 8:
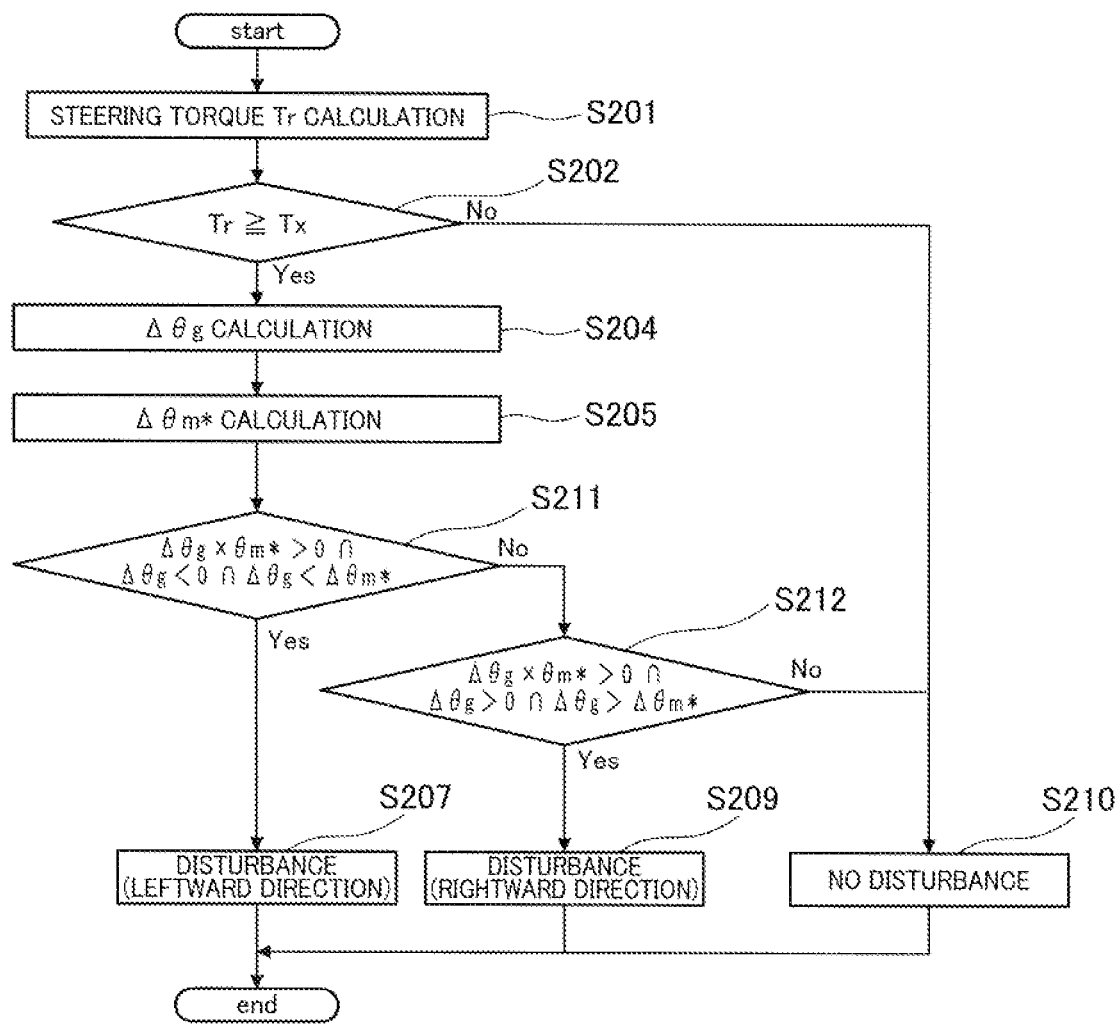
FIG. 8 is a flow chart showing a disturbance judgment operation of a steering intention judging section according to a variation of the second embodiment.

FIG. 8 shows a variation of the above-described second embodiment. In this variation, the flow of the disturbance judging process by the steering intension judging section 67 is partially varied.

That is, in the flow of the variation shown in FIG. 8, step S203 of the second embodiment is omitted. Moreover, step S206 and step S208 are replaced, respectively, by step S211 and step S212 described later.

At step S211, it is judged whether or not the rotation direction of the output shaft 15 is identical to the drive direction of the hollow motor 30, that is, whether or not the positive or negative symbol of the output shaft angular speed $\Delta\theta g$ is identical to the positive or negative symbol of the motor angular speed control target $\Delta\theta m^*$ ($\theta g \times \theta m^* > 0$). Moreover, it is judged whether or not the output shaft angular speed $\Delta\theta g$ is smaller than 0, and smaller than the motor angular speed control target $\Delta\theta m^*$, that is, whether or not the phase of the output shaft rotation angle $\theta g$ precedes the phase of the motor rotation angle control target $\theta m^*$ (the phase of the rotation angle of the hollow motor 30) in the leftward direction (the counterclockwise direction) of the rotation axis Z. In case of Yes judgment, the process proceeds to step S207. On the other hand, in case of No judgment, the process proceeds to step S210.

Moreover, at step S212, it is judged whether or not the rotation direction of the output shaft 15 is identical to the drive direction of the hollow motor 30, that is, whether or not the positive or negative symbol of the output shaft angular speed $\Delta\theta g$ is identical to the positive or negative symbol of the motor angular speed control target $\Delta\theta m^*$ ($\theta g \times \theta m^* > 0$). Moreover, it is judged whether or not the output shaft angular speed $\Delta\theta g$ is greater than 0, and greater than the motor angular speed control target $\Delta\theta^*$, that is, whether or not the phase of the output shaft rotation angle $\theta g$ precedes the phase of the motor rotation angle control target $\theta m^*$ in the rightward direction (the clockwise direction) of the rotation axis Z. In case of Yes judgment, the process proceeds to step S209. On the other hand, in case of No judgement, the process proceeds to step S210.

Accordingly, in this variation, the steering intention judging section 67 can judge whether or not there is the disturbance from the road surface. Accordingly, it is possible to obtain the same effects and operations identical to those of the above-described second embodiment.

Third Embodiment

Figure 9:
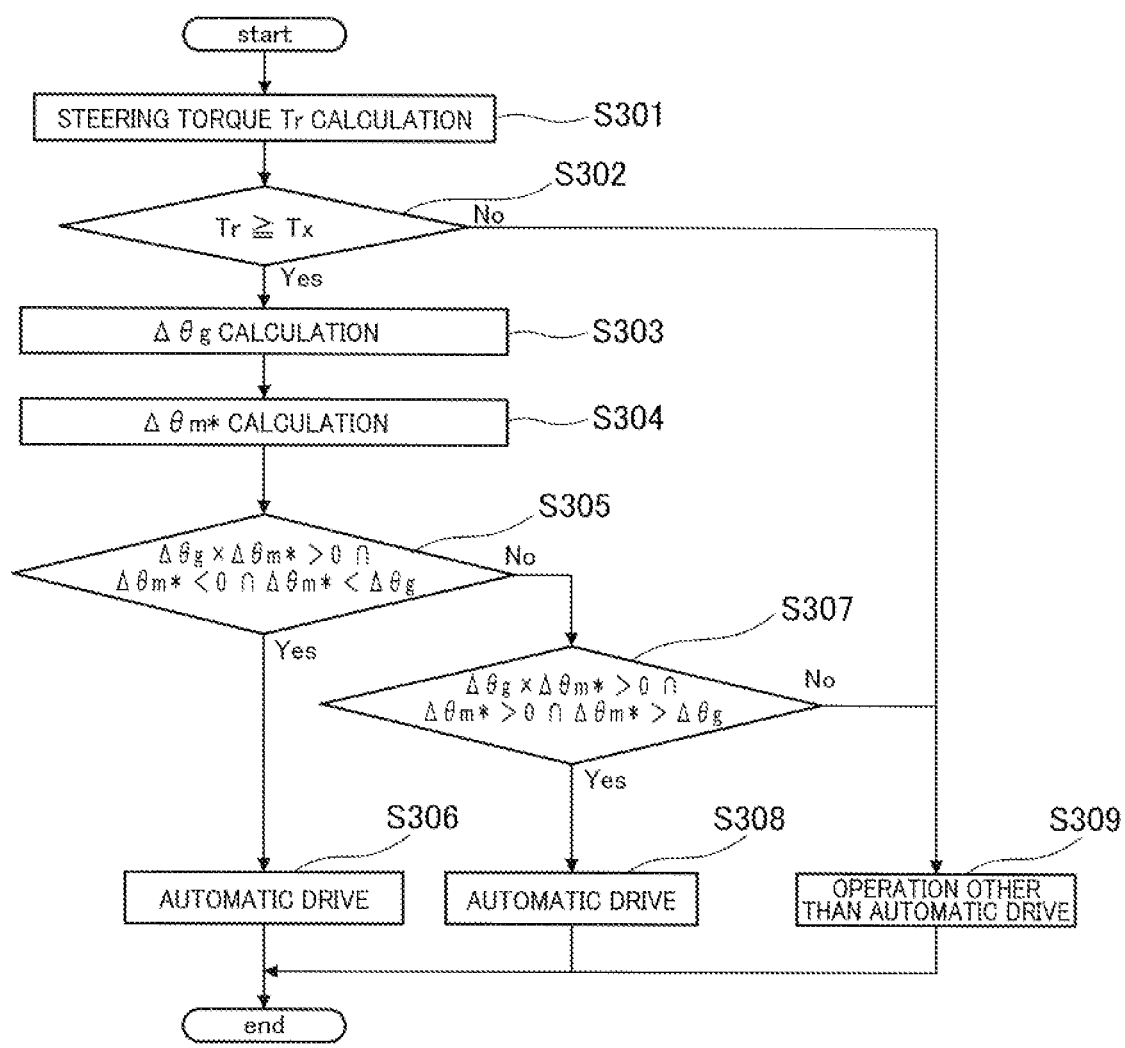
FIG. 9 is a flow chart showing an automatic drive judgment operation of a steering intention judging section according to a third embodiment.

In a third embodiment according to the present invention, the steering intention judging section 67 includes a function to actively judge whether or not the automatic drive control is performed. FIG. 9 is a flowchart showing this judgment process.

That is, in this flow, firstly, the steering torque Tr is calculated based on the input shaft rotation angle $\theta h$ and the intermediate shaft rotation angle $\theta m$ (step S301). It is judged whether or not this steering torque Tr is equal to or greater than the predetermined value Tx (step S302). In case of No judgment, the process is finished without performing the judgment of the automatic drive control. On the other hand, in case of Yes judgment, the output shaft rotation angle $\theta g$ and the motor rotation angle control target $\theta m^*$ are time-differentiated (differentiated by time) to calculate the output shaft angular speed $\Delta\theta g$ and the motor angular speed control target $\Delta\theta m^*$ (step S303, S304). The process proceeds to step S305.

At step S305, it is judged whether or not the rotation direction of the output shaft 15 is identical to the drive direction of the hollow motor 30, that is, whether or as not the positive or negative symbol of the output shaft angular speed $\Delta\theta g$ is identical to the positive or negative symbol of the motor angular speed $\Delta\theta m^*$ ($\theta g \times \theta m^* > 0$). Moreover, it is judged whether or not the motor angular speed control target $\Delta\theta m^*$ is smaller than 0, and smaller than the output shaft angular speed $\Delta\theta g$, that is, whether or not the phase of the motor rotation angle control target $\theta m^*$ precedes the phase of the output shaft rotation angle $\theta g$ in the leftward direction (the counterclockwise direction) of the rotation axis Z. In case of Yes judgment, the steering intention judging section 67 judges the automatic drive state, that is, that the output shaft 15 is driven and rotated by the rotational force of the hollow motor 30 in the normal state (step S306). The operation judging process of the automatic drive control is finished. On the other hand, in case of No judgment, the process proceeds to step S307.

At step S307, it is judged whether or not the positive or negative symbol of the output shaft angular speed $\Delta\theta g$ is identical to the positive or negative symbol of the motor angular speed control target $\Delta\theta m^*$ ($\theta g \times \theta m^* > 0$). Moreover, it is judged whether or not the motor angular speed control target $\Delta\theta^*$ is greater than 0, and greater than the output shaft angular speed $\Delta\theta g$, that is, whether or not the phase of the motor rotation angle control target $\theta m^*$ precedes the phase of the output shaft rotation angle $\theta g$ in the rightward direction (the clockwise direction) of the rotation axis Z. In Yes judgment, the steering intention judging section 67 judges the automatic drive state, that is, that the output shaft 15 is driven and rotated by the rotational force of the hollow motor 30 in the normal state. The process is finished (step S308). On the other hand, in case of No judgment, the steering intention judging section 67 judges the operation other than the automatic drive (step S309). The process is finished.

Accordingly, in this embodiment, it is possible to obtain the operations and effects which are identical to those of the first embodiment. Moreover, the steering intention judging section 67 can actively judge whether or not the automatic drive control is performed, in addition to the judgment of the steering intention of the driver. Accordingly, it is possible to more accurately switch the automatic drive and the manual drive in accordance with the conditions.

Fourth Embodiment

Figure 10:
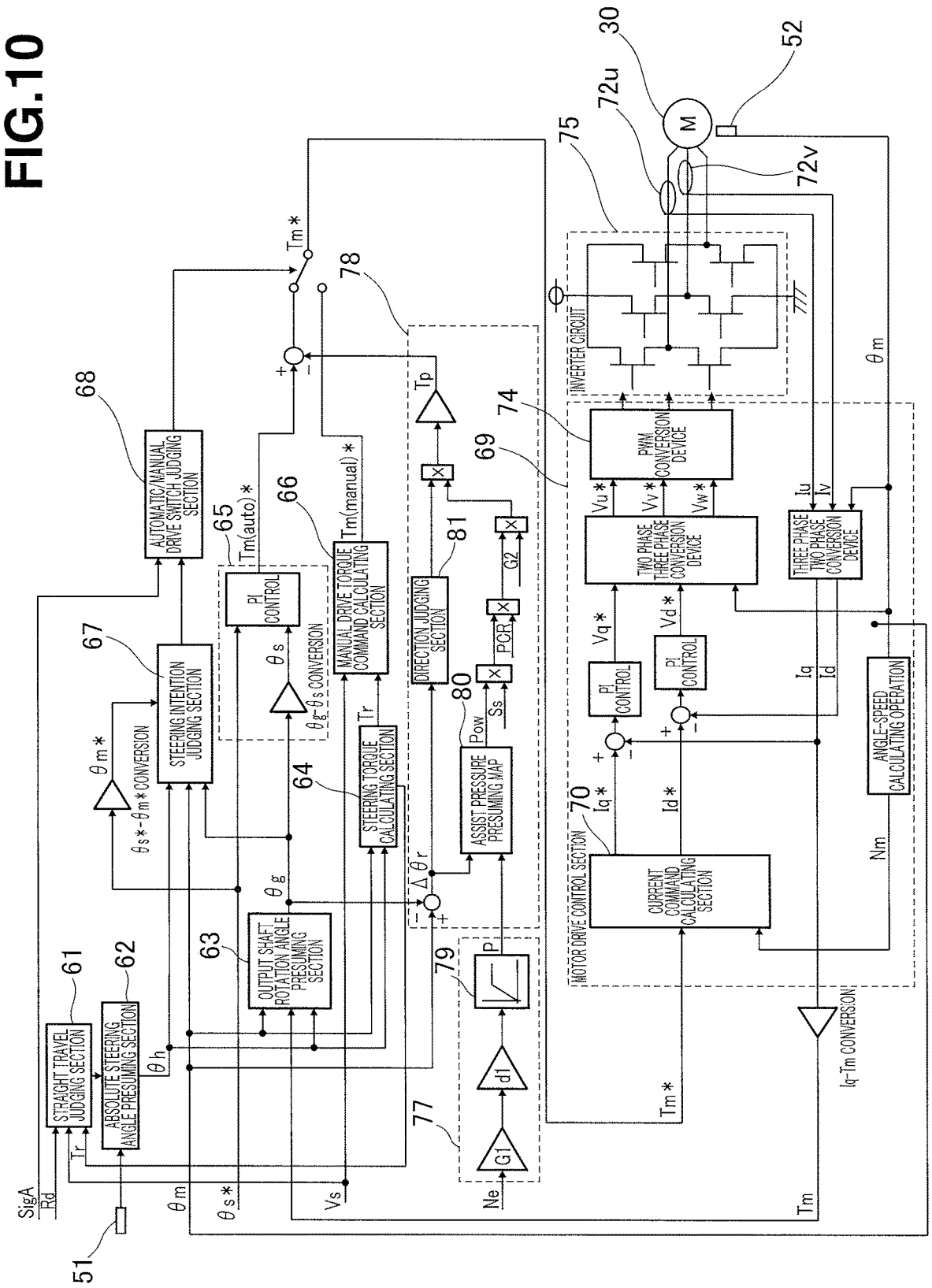
FIG. 10 is a control block diagram showing a calculation circuit configuration of a control device according to a fourth embodiment.

In a fourth embodiment of the present invention shown in FIG. 10, it is possible to adjust the output of the hollow motor 30 in accordance with the hydraulic pressure torque produced by the power cylinder 18.

That is, the control device 60 according to this embodiment includes a supply fluid amount calculating section 77 configured to presume a pump discharge amount P which is a fluid amount of the hydraulic fluid supplied from the pump 3 to the rotary valve 19; and a hydraulic actuator torque calculating section 78 configured to presume a hydraulic pressure torque Tp produced by the power cylinder 18 based on the fluid amount of the hydraulic fluid presumed by the supply fluid amount calculating section 77, and so on, in addition to the configuration of the first embodiment.

The supply fluid amount calculating section 77 is configured to presume the pump discharge amount P of the pump 3 based on the engine speed Ne, since the pump 3 is an engine driven pump driven by the engine of the vehicle. In particular, the supply fluid amount calculating section 77 is configured to multiply the gear ratio G1 between the engine and the pump, and the pump inherent discharge amount d1, to the engine speed Ne. The thus-obtained value is inputted to an adjustment flow rate limiter 79 set in accordance with specification of the pump 3, so as to presume the pump discharge amount P.

Firstly, the hydraulic actuator torque calculating section 78 is configured to obtain a valve working angle $\Delta\theta r$ of the rotary valve 19 by subtracting the output shaft rotation angle $\theta g$ from the intermediate shaft rotation angle $\theta m$. Then, the hydraulic actuator torque calculating section 78 is configured to calculate an assist pressure presumption value Pow with reference to a previously prepared assist pressure presumption map 80 from this valve working angle Δθr and the pump discharge amount P presumed by the supply fluid amount calculating section 77.

Next, the hydraulic actuator torque calculating section 78 is configured to obtain the hydraulic pressure torque Tp by multiplying a cylinder sectional area Ss of the power cylinder 18, a distance PCR from the center of the rotation of the sector shaft 17 to a teeth abutting surface of the sector shaft 17 with the piston 16, and a gear ratio G2 between the piton 16 and the sector shaft 17, to the assist pressure presumption value Pow, so as to obtain the hydraulic pressure torque Tp. Besides, the hydraulic pressure torque Tp obtained at this time is a scalar value which has only an amount. The positive or negative symbols is added by the direction judging section 81 configured to judge the actuation direction of the hydraulic pressure torque Tp based on the valve working angle Δθr. Then, the hydraulic actuator torque calculating section 78 is configured to finally calculate the hydraulic pressure torque Tp by multiplying a correction coefficient previously set based on the vehicle test and so on, to the hydraulic pressure torque Tp to which the positive or negative symbol is added.

Moreover, the motor drive control section 69 according to this embodiment is configured to receive, as the motor torque command value Tm*, a value obtained by subtracting the hydraulic pressure torque Tp calculated by the hydraulic actuator torque calculating section 78 from the automatic drive torque command value Tin (auto)* outputted from the automatic drive torque command calculating section 65, at the automatic drive, and to perform the drive control of the hollow motor 30.

Accordingly, in this embodiment, it is possible to perform the automatic drive by the cooperative control of the hydraulic pressure torque Tp produced by the power cylinder 18, and the drive torque outputted from the hollow motor 30. Accordingly, for example, even when the engine speed Ne is low and it is not possible to ensure the hydraulic pressure torque TP, it is possible to maintain the steering assist force by increasing the drive torque of the hollow motor 30. Moreover, on the other hand, it is possible to suppress providing the redundant assist force at the automatic drive. Accordingly, it is possible to improve the accuracy of the steering at the automatic drive. Moreover, it is possible to decrease the loss of the electric power and the hydraulic pressure, and to save the energy.

Moreover, in this embodiment, the pump 3 is the engine driven pump. The supply fluid amount calculating section 77 is configured to presume the pump discharge amount P based on the engine speed Ne. Accordingly, it is possible to sense the pump discharge amount P with the high accuracy. Consequently, it is possible to perform the cooperative control of the automatic drive by the power cylinder 18 and the hollow motor 30 with the high accuracy.

Fifth Embodiment

Figure 11:
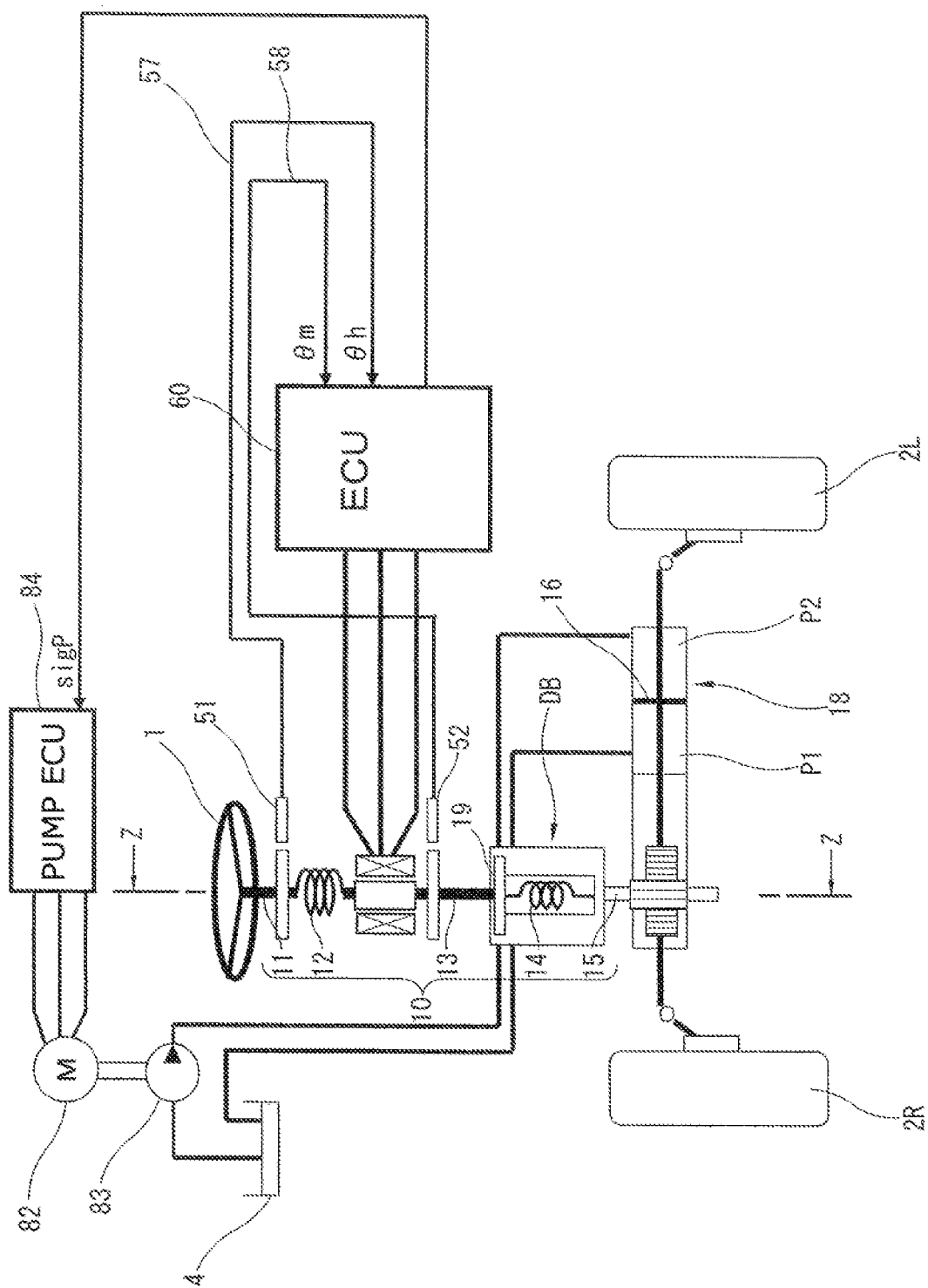
FIG. 11 is a schematic view showing a power steering apparatus according to a fifth embodiment.
Figure 12:
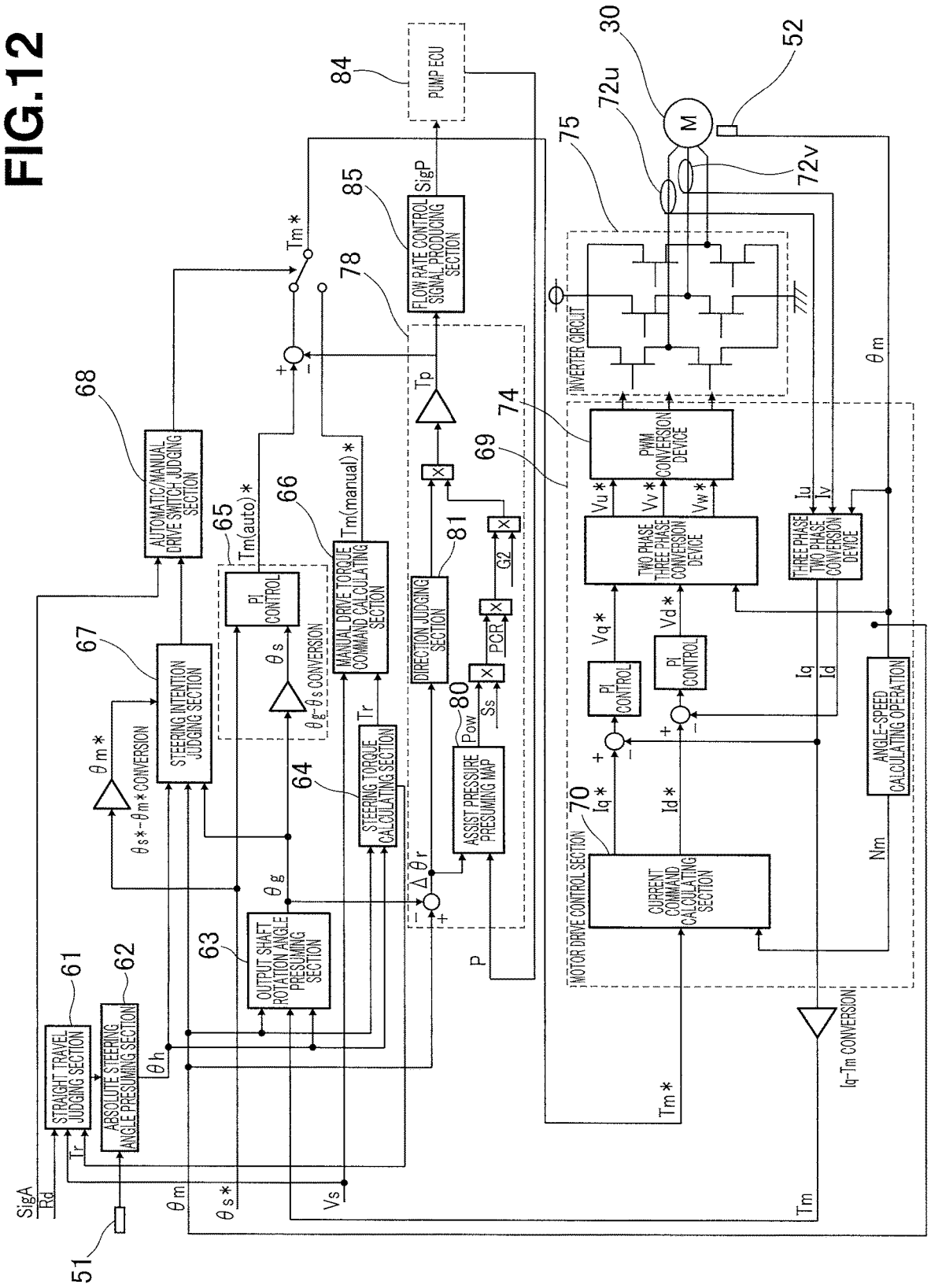
FIG. 12 is a control block diagram showing a calculation circuit configuration of a control device according to a fifth embodiment.

In a fifth embodiment of the present invention shown in FIG. 11 and FIG. 12, the pump 3 of the engine driven pump in the fourth embodiment is varied to a motor driven pump 83 arranged to be driven by a pump drive electric motor 82. Moreover, the pump driven electric motor 82 is controlled and driven based on the hydraulic pressure Tp produced by the power cylinder 18.

FIG. 11 is a schematic view showing a power steering apparatus according to this embodiment.

That is, the pump drive electric motor 82 is electrically connected to a pump ECU 84 which is different from the control device 60. The pump drive electric motor 82 is driven and rotated based on a command voltage outputted from the pump ECU 84, so that the motor driven pump 83 according to the embodiment performs a pump function.

The pump ECU 84 is configured to produce the command voltage based on a flow rate control signal (flow amount control signal) SigP for setting the pump discharge amount P of the motor driven pump 83 to the target value. In this embodiment, the control device 60 produces the flow rate control signal SigP.

FIG. 12 is a control block diagram showing a calculation circuit configuration of the control device 60 according to this embodiment.

That is, the control device 60 according to this embodiment includes a flow rate control signal producing section 85 configured to produce the flow rate control signal SigP based on the hydraulic pressure torque Tp presumed by the hydraulic actuator torque calculating section 78, and to output the flow rate control signal SigP to the pump ECU 84.

This flow rate control signal producing section 85 is configured to basically produce the flow rate control signal SigP only based on the hydraulic pressure torque Tp. However, the flow rate control signal producing section 85 is configured to produce the flow rate control signal SigP by adding or subtracting a correction value to or from the hydraulic pressure torque Tp in a specific condition.

For example, when the steering amount at the automatic drive is small and the valve working angle Δθr of the rotary valve 19 is small, that is, in a case where almost of the hydraulic fluid is discharged to the reservoir tank 4 without generating the hydraulic pressure torque Tp even when the motor driven pump 83 discharge much hydraulic fluid, the flow rate control signal producing section 85 is configured to perform the subtraction correction of the hydraulic torque Tp, and thereby to produce the flow rate control signal SigP to suppress the pump discharge amount P relative to the normal operation. With this, in the torque for the automatic drive, the hydraulic pressure torque Tp is decreased. On the other hand, the drive torque of the hollow motor 30 is increased to compensate for this decrease of the torque.

When the hollow motor 30 is heated due to the high speed drive, the flow rate control signal producing section 85 is configured to perform the addition correction of the hydraulic pressure torque Tp, and thereby to produce the flow rate control signal SigP to increase the pump discharge amount P relative to the normal operation. With this, in the torque for the automatic drive, the rate of the hydraulic pressure torque Tp is increased, so that the drive torque of the hollow motor 30 is decreased.

In this way, when one of the hollow motor 30 and the motor driven pump 83 is in the malfunction, or has the bad efficiency, the flow rate control signal producing section 85 is configured to decrease the torque output sharing rate of the one of the hollow motor 30 and the motor driven pump 83, and to increase the torque output sharing rate of the other of the hollow motor 30 and the motor driven pump 83.

Besides, the hydraulic actuator torque calculating section 78 according to this embodiment is configured to directly obtain the information of the pump discharge amount P from the pump ECU 84, and to presume the assist pressure presumption value Pow based on this information of the pump discharge pressure P.

In a case where the pump arranged to discharge the hydraulic fluid to the rotary valve 19 is the engine driven valve, the pump discharges the hydraulic fluid in accordance with the engine speed Ne irrespective of the valve working angle Δθr of the rotary valve 19. Accordingly, for example, when the engine speed Ne is high and the valve working angle Δθr is small (slight), the hydraulic fluid discharged by the engine driven pump does not serve for generating the hydraulic pressure Tp, and is discharged to the reservoir tank 4. Accordingly, the pump efficiency may be deteriorated.

On the other hand, in this embodiment, the pump is the motor driven pump 83. This motor driven pump 83 is driven and controlled based on the flow rate control signal SigP produced by the flow rate control signal producing section 85 from the hydraulic pressure torque Tp. Accordingly, it is possible to suppress the redundant discharge of the hydraulic fluid by the motor driven pump 83. Moreover, it is possible to improve the pump efficiency.

Moreover, it is judged that one of the hollow motor 30 and the motor driven pump 83 is in the malfunction, or has the bad efficiency, the flow rate control signal producing section 85 is configured to decrease the torque output sharing rate of the one of the hollow motor 30 and the motor driven pump 83, and to increase the torque output sharing rate of the other of the hollow motor 30 and the motor driven pump 83. Accordingly, it is possible to protect the devices, and to attain the efficient control.

Besides, in this embodiment, the pump is the motor driven pump 83 driven by the pump drive electric motor 82. However, the pump is a variable displacement discharge pump arranged to adjust the discharge amount of the hydraulic fluid by an electromagnetic solenoid, in place of the motor driven pump 83. In this case, it is also possible to attain the same effects and operations by driving the electromagnetic solenoid based on the flow rate control signal SigP produced by the flow rate control signal producing section 85 from the hydraulic pressure torque Tp.

Sixth Embodiment

Figure 13:
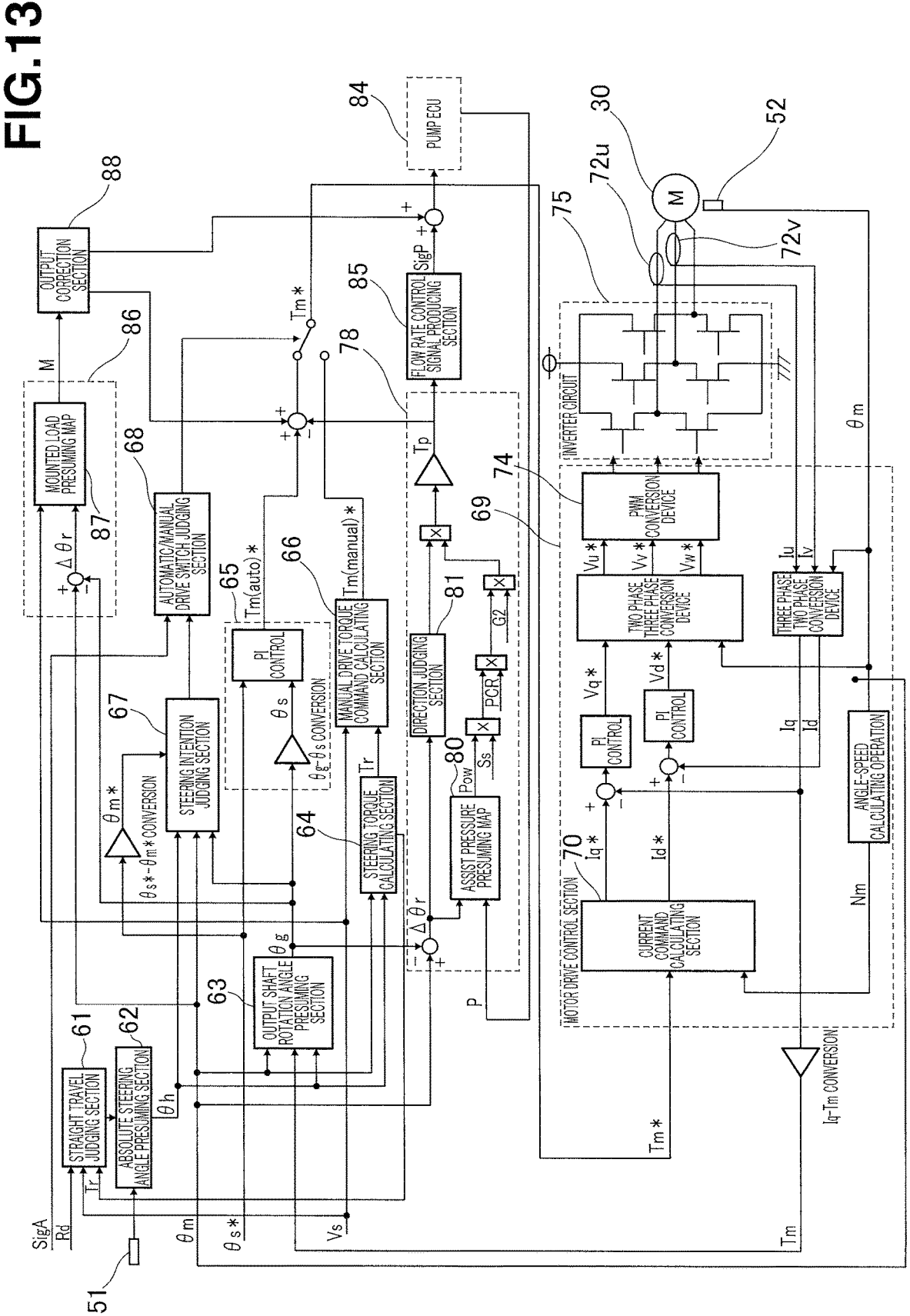
FIG. 13 is a control block diagram showing a calculation circuit configuration of a control device according to a sixth embodiment.

In a sixth embodiment of the present invention shown in FIG. 13, the control device 60 includes a mounted load presuming section 86 which is a load presuming section configured to presume a mounted load M that is a load with respect to the vehicle based on a weight of a luggage (charge) mounted on the vehicle, relative to the control device 60 according to the fifth embodiment.

The mounted load presuming section 86 is configured to obtain the valve working angle Δθr of the rotary valve 19 by subtracting the output shaft rotation angle θg from the intermediate shaft rotation angle θm. Then, the mounted load presuming section 86 is configured to presume the mounted load M with reference to a previously prepared mounted load presuming map 87 from the valve working angle Δθr and the vehicle speed Vs.

Moreover, in the mounted load presuming section 86, an output correction section 88 is configured to correct to increase the automatic drive torque command value Tm (auto)* for the drive rotation of the hollow motor 30, and the flow rate control signal SigP for the rotation drive of the pump drive motor 82, when the mounted load M obtained by the above-described presuming operation is equal to or greater than a predetermined value.

Besides, although it is not shown in the drawings, when the mounted load M obtained by the above-described presuming operation is equal to or greater than the predetermined value, the mounted load presuming section 86 is configured to output this information to a traction controller, an ESC controller, and so on, and thereby to perform various cooperative controls to suppress the understeering by decreasing the vehicle speed at the turning.

In general, it is not possible to obtain the steered angle corresponding to the drive torque of the hollow motor 30 and the hydraulic pressure torque Tp as the mounted as load M of the vehicle becomes larger. The behavior at the automatic drive becomes unstable.

On the other hand, in this embodiment, the control device 60 includes the mounted load presuming section 86 configured to presume the mounted load M. When the mounted load M presumed by this mounted load presuming section 86 is equal to or greater than the predetermined value, the hydraulic pressure torque Tp and the drive torque of the hollow motor 30 are corrected to be increased. With this, it is possible to suppress the destabilization of the behavior according to the increase of the mounted load M at the automatic drive, and to attain the steering control according to the mounted load M.

Seventh Embodiment

Figure 14:
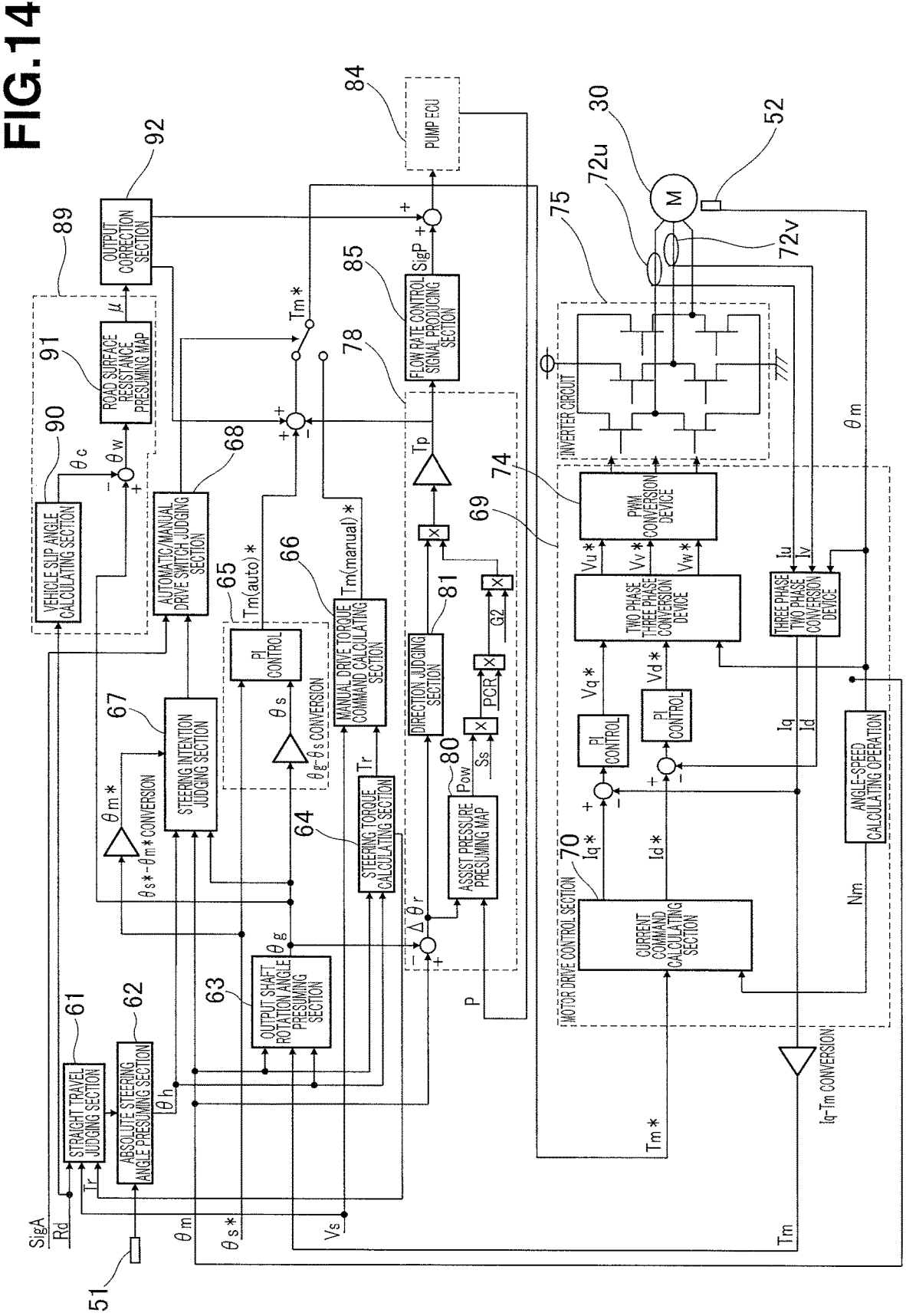
FIG. 14 is a control block diagram showing a calculation circuit configuration of a control device according to a seventh embodiment.

In a seventh embodiment of the present invention shown in FIG. 14, the control device 60 includes a road surface resistance presuming section 89 which is a load presuming section configured to presume the load with respect to the vehicle based on a road surface resistance μ, relative to the control device 60 according to the fifth embodiment.

The road surface resistance presuming section 89 is configured to calculate a vehicle slip angle θc based on a previously prepared vehicle slip calculation map 90 from a rotation speed difference Rd between the pair of the steered wheels 2R and 2L, and to obtain a steered wheel slip angle θw by subtracting the vehicle slip angle θc from the output shaft rotation angle θg. Then, the road surface resistance presuming section 89 is configured to presume the road surface resistance μ based on a previously prepared road surface resistance presuming map 91 from this steered wheel slip angle θw.

When the road surface resistance μ obtained by the presuming operation is equal to or greater than a predetermined value, in the road surface resistance presuming section 89, an output correction section 92 is configured to correct to increase the automatic drive torque command value Tm (auto)* for the drive rotation of the hollow motor 30, and the flow rate control signal SigP for the drive rotation of the pump drive motor 82.

Besides, although it is not shown in the drawings, the road surface resistance presuming section 89 is configured to transmit the road surface resistance μ obtained by the above-described presuming operation to the traction controller, the ESC controller, and so on. With this, it is possible to improve the stability of the vehicle in cooperation with the various controllers, and so on.

In general, it is not possible to obtain the steered angle corresponding to the drive torque of the hollow motor 30 and the hydraulic pressure torque Tp as the road surface resistance μ becomes greater, so that the behavior at the automatic drive becomes unstable.

Contrary to this, in this embodiment, the control device 60 includes the road surface resistance presuming section 89 configured to presume the road surface resistance μ. Moreover, when the road surface resistance μ presumed by this road surface resistance presuming section 89 is equal to or greater than the predetermined value, the hydraulic pressure torque Tp and the drive torque of the hollow motor 30 are corrected to be increased. Accordingly, it is possible to suppress the destabilization of the behavior at the automatic drive according to the increase of the road surface resistance μ, and to attain the steering control according to the road surface resistance μ.

The present invention is not limited to the configurations exemplified in the embodiments. The present invention is applicable to other type power steering apparatus such as a power steering apparatus of a rack and pinion type which is used for a normal vehicle and so on, as long as the power steering apparatus includes the invention specific components of the present invent such as the first and second torsion bars 12 and 14, the hollow motor 30, and so on.

Moreover, in the present invention, the output shaft rotation angle presuming section 63 presumes the output shaft rotation angle θg. With this, it is possible to obtain the output shaft rotation angle θg without depending on the sensors. However, the present invention is applicable to a power steering apparatus including sensors arranged to sense the output shaft rotation angle θg and the steered angle. In this case, it is possible to improve the failsafe characteristics by using, as the backup, the output shaft rotation angle θg presumed by the output shaft rotation angle presuming section 63 when the function of the sensor is malfunctioned. Moreover, it is possible to improve the accuracy of the control of the hollow motor 30 by driving the hollow motor 30 based on the output shaft rotation angle θg sensed by the sensor, and the output shaft rotation angle θg presumed by the output shaft rotation angle presuming section 63.

Besides, in the above-described embodiments, the output shaft rotation angle θg presumed by the output shaft rotation angle presuming section 63 is used mainly for the automatic drive control. However, this presumed output shaft rotation angle θg may be used for the manual drive control.

For example, the following aspects are conceivable as the power steering apparatuses according to the above-described embodiments.

A power steering apparatus according to one aspect includes a steering shaft including an input shaft arranged to be rotated in accordance with a steering operation of a steering wheel, an intermediate shaft connected through a first torsion bar to the input shaft, and an output shaft connected through a second torsion bar to the intermediate shaft; a hydraulic actuator including a pair of pressure chambers separated by a piston; a conversion mechanism arranged to convert a rotation movement of the steering shaft to a motion direction movement of the piston, and to transmit the steering operation of the steering wheel to steered wheels; a control valve arranged to selectively supply a hydraulic fluid supplied from a pump mounted on a vehicle in accordance with a torsion amount and a torsion direction of the second torsion bar, to the pair of the pressure chambers; an electric motor arranged to provide a rotation force to the intermediate shaft; a control unit including a microcomputer; an output shaft rotation angle presuming section provided to the control unit, and configured to presume a rotation angle of the output shaft based on a signal of a rotation angle of the input shaft, a signal of a rotation angle of the intermediate shaft, a torsion spring constant of the first torsion bar, and a torsion spring constant of the second torsion bar; and a motor drive control section provided to the control unit, and configured to control and drive the electric motor based on the rotation angle of the output shaft.

In a preferred aspect of the power steering apparatus, the power steering apparatus further includes a steering intension judging section provided to the control unit, and configured to judge whether or not a driver has a steering intension, based on the signal of the rotation angle of the input shaft, the signal of the rotation angle of the intermediate shaft, the signal of the rotation angle of the output shaft, or the signal of the rotation angle of the electric motor.

In another aspect of the power steering apparatus, the steering intention judging section is configured to judge that the driver has the steering intention when a phase of the rotation angle of the input shaft precedes a phase of the rotation angle of the intermediate shaft or a phase of the rotation angle of the output shaft.

In still another aspect, in one of the aspects of the power steering apparatus, the steering intention judging section is configured to judge that the rotation of the output shaft is caused due to a disturbance from a road surface when a phase of the rotation angle of the output shaft precedes a phase of the rotation angle of the input shaft, and when a rotation direction of the output shaft is not identical to a driving direction of the electric motor.

In still another aspect, in one of the aspects of the power steering apparatus, the steering intention judging section is configured to judge that the rotation of the output shaft is caused due to a disturbance from a road surface when a rotation direction of the output shaft is identical to a driving direction of the electric motor, and when a phase of the rotation angle of the output shaft precedes a phase of the rotation angle of the electric motor.

In still another aspect, in one of the aspects of the power steering apparatus, the steering intension judging section is configured to judge that the rotation of the output shaft is caused by the rotational force of the electric motor when the rotation direction of the output shaft is identical to the driving direction of the electric motor, and when a phase of the rotation angle of the electric motor precedes a phase of the rotation angle of the output shaft.

In still another aspect, in one of the aspects of the power steering apparatus, the steering intension judging section is configured to judge that the rotation of the output shaft is caused by an influence of a disturbance from a road surface when a phase of the rotation angle of the output shaft precedes a phase of the rotation angle of the input shaft, or a phase of the rotation angle of the electric motor; and the motor drive control section is configured to drive and control the electric motor so as to suppress the rotation of the output shaft due to the disturbance.

In still another aspect, in one of the aspects of the power steering apparatus, the control unit includes a supplied fluid amount calculating section configured to presume a fluid amount of the hydraulic fluid supplied from the pump to the control valve, and a hydraulic actuator torque calculating section configured to presume a torque generated in the hydraulic actuator based on the signal of the rotation angle of the intermediate shaft, the signal of the rotation angle of the output shaft, and the fluid amount of the hydraulic fluid.

In still another aspect, in one of the aspects of the power steering apparatus, the pump is an engine driven pump arranged to be driven by an engine of a vehicle; and the fluid amount of the hydraulic fluid is presumed based on an engine speed.

In still another aspect, in one of the aspects of the power steering apparatus, the pump is a motor driven pump arranged to be driven by a pump drive electric motor, or a variable discharge amount pump arranged to adjust a discharge amount of the hydraulic fluid by an electromagnetic solenoid; and the pump drive electric motor or the electromagnetic solenoid is controlled and driven based on the torque generated in the hydraulic actuator.

In still another aspect, in one of the aspects of the power steering apparatus, the control unit is configured to adjust a rate between a drive torque of the electric motor, and the torque generated in the hydraulic actuator, and to control and drive the electric motor, and the motor driven pump or the electromagnetic solenoid based on the adjusted rate.

In still another aspect, in one of the aspects of the power steering apparatus, the electric motor is arranged to be controlled and driven based on the torque generated in the hydraulic actuator.

In still another aspect, in one of the aspects of the power steering apparatus, the control unit includes a load presuming section configured to presume a weight of a luggage mounted on a vehicle, based on the signal of the rotation angle of the intermediate shaft, the signal of the rotation angle of the output shaft, and a vehicle speed.

In still another aspect, in one of the aspects of the power steering apparatus, the control unit includes a load presuming section configured to presume a road surface resistance based on the signal of the rotation angle of the output shaft, and a rotation speed difference between a pair of the steered wheels.

In still another aspect, in one of the aspects of the power steering apparatus, the control unit includes a steering torque calculating section configured to calculate a steering torque based on the signal of the rotation angle of the input shaft, the signal of the rotation angle of the intermediate shaft, and the torsion spring constant of the first torsion bar, a straight travel judging section configured to judge whether or not the vehicle travels in a straight manner based on a vehicle speed, a rotation speed difference between a pair of the steered wheels, and the steering torque, and an absolute steering angle presuming section configured to presume an absolute steering angle of the steering wheel corresponding to a steered angle of the steered wheels based on a rotation amount of the input shaft or a rotation amount of the intermediate shaft from a state where the straight traveling judging section judges the straight travel.

In still another aspect, in one of the aspects of the power steering apparatus, the conversion mechanism is a ball screw mechanism including a screw shaft provided to the output shaft, a nut having a cylindrical shape surrounding the screw shaft, and including a helical groove formed on an inner circumference side, and a plurality of balls provided between the screw shaft and the nut.

In still another aspect, in one of the aspects of the power steering apparatus, the electric motor is a hollow motor provided to surround the intermediate shaft.

The invention claimed is:

1. A power steering apparatus comprising:
   a steering shaft including an input shaft arranged to be rotated in accordance with a steering operation of a steering wheel, an intermediate shaft connected through a first torsion bar to the input shaft, and an output shaft connected through a second torsion bar to the intermediate shaft;
   a hydraulic actuator including a pair of pressure chambers separated by a piston;
   a ball screw mechanism arranged to convert a rotation movement of the steering shaft to a motion direction movement of the piston, and to transmit the steering operation of the steering wheel to steered wheels;
   a control valve arranged to selectively supply a hydraulic fluid supplied from a pump mounted on a vehicle in accordance with a torsion amount and a torsion direction of the second torsion bar, to the pair of the pressure chambers;
   an electric motor arranged to provide a rotation force to the intermediate shaft; and
   a control unit including a microcomputer, the control unit being configured to
      estimate a rotation angle of the output shaft based on a signal of a rotation angle of the input shaft, a signal of a rotation angle of the intermediate shaft, a torsion spring constant of the first torsion bar, and a torsion spring constant of the second torsion bar, and
      control and drive the electric motor based on the rotation angle of the output shaft.

2. The power steering apparatus as claimed in claim 1, wherein the control unit is configured to judge whether or not a driver has a steering intention, based on the signal of the rotation angle of the input shaft, the signal of the rotation angle of the intermediate shaft, a signal of the rotation angle of the output shaft, or a signal of a rotation angle of the electric motor.

3. The power steering apparatus as claimed in claim 2, wherein the control unit is configured to judge that the driver has the steering intention when a phase of the rotation angle of the input shaft precedes a phase of the rotation angle of the intermediate shaft or a phase of the rotation angle of the output shaft.

4. The power steering apparatus as claimed in claim 2, wherein the control unit is configured to judge that the rotation of the output shaft is caused due to a disturbance from a road surface when a phase of the rotation angle of the output shaft precedes a phase of the rotation angle of the input shaft, and when a rotation direction of the output shaft is not identical to a driving direction of the electric motor.

5. The power steering apparatus as claimed in claim 2, wherein the control unit is configured to judge that the rotation of the output shaft is caused due to a disturbance from a road surface when a rotation direction of the output shaft is identical to a driving direction of the electric motor, and when a phase of the rotation angle of the output shaft precedes a phase of the rotation angle of the electric motor.

6. The power steering apparatus as claimed in claim 2, wherein the control unit is configured to judge that the rotation of the output shaft is caused by the rotational force of the electric motor when the rotation direction of the output shaft is identical to a driving direction of the electric motor, and when a phase of the rotation angle of the electric motor precedes a phase of the rotation angle of the output shaft.

7. The power steering apparatus as claimed in claim 2, wherein the control unit is configured to judge that the rotation of the output shaft is caused by an influence of a disturbance from a road surface when a phase of the rotation angle of the output shaft precedes a phase of the rotation angle of the input shaft, or a phase of the rotation angle of the electric motor; and the control unit is configured to drive and control the electric motor so as to suppress the rotation of the output shaft due to the disturbance.

8. The power steering apparatus as claimed in claim 1, wherein the control unit is configured to estimate a fluid amount of the hydraulic fluid supplied from the pump to the control valve, and to estimate a torque generated in the hydraulic actuator based on the signal of the rotation angle of the intermediate shaft, a signal of the rotation angle of the output shaft, and the fluid amount of the hydraulic fluid.

9. The power steering apparatus as claimed in claim 8, wherein the pump is an engine driven pump arranged to be driven by an engine of the vehicle; and the fluid amount of the hydraulic fluid is estimated based on an engine speed.

10. The power steering apparatus as claimed in claim 8, wherein the pump is a motor driven pump arranged to be driven by a pump drive electric motor, or a variable discharge amount pump arranged to adjust a discharge amount of the hydraulic fluid by an electromagnetic solenoid; and the pump drive electric motor or the electromagnetic solenoid is controlled and driven based on the torque generated in the hydraulic actuator.

11. The power steering apparatus as claimed in claim 10, wherein the control unit is configured to adjust a ratio between a drive torque of the electric motor and the torque generated in the hydraulic actuator, and to control and drive the electric motor, and the motor driven pump or the electromagnetic solenoid based on the adjusted ratio.

12. The power steering apparatus as claimed in claim 8, wherein the electric motor is arranged to be controlled and driven based on the torque generated in the hydraulic actuator.

13. The power steering apparatus as claimed in claim 1, wherein the control unit is configured to estimate a weight of a luggage mounted on the vehicle, based on the signal of the rotation angle of the intermediate shaft, a signal of the rotation angle of the output shaft, and a vehicle speed.

14. The power steering apparatus as claimed in claim 1, wherein the control unit is configured to estimate a road surface resistance based on a signal of the rotation angle of the output shaft, and a rotation speed difference between a pair of the steered wheels.

15. The power steering apparatus as claimed in claim 1, wherein the control unit is configured to calculate a steering torque based on the signal of the rotation angle of the input shaft, the signal of the rotation angle of the intermediate shaft, and the torsion spring constant of the first torsion bar, to judge whether or not the vehicle travels in a straight manner based on a vehicle speed, a rotation speed difference between a pair of the steered wheels, and the steering torque, and to estimate an absolute steering angle of the steering wheel corresponding to a steered angle of the steered wheels based on a rotation amount of the input shaft or a rotation amount of the intermediate shaft from a state where the control unit judges a straight travel.

16. The power steering apparatus as claimed in claim 1, wherein the ball screw mechanism includes a screw shaft provided to the output shaft, a nut having a cylindrical shape surrounding the screw shaft, and including a helical groove formed on an inner circumference side, and a plurality of balls provided between the screw shaft and the nut.

17. The power steering apparatus as claimed in claim 16, wherein the electric motor is a hollow motor provided to surround the intermediate shaft.

\* \* \* \* \*